United States Patent

[11] 3,627,758

| [72] | Inventors | Kurt Weber<br>Basel;<br>Peter Liechti, Binningen; Hans Rudolf<br>Meyer; Adolf Emil Siegrist, both of Basel,<br>all of Switzerland |
|---|---|---|
| [21] | Appl. No. | 790,864 |
| [22] | Filed | Jan. 13, 1969 |
| [45] | Patented | Dec. 14, 1971 |
| [73] | Assignee | Ciba Limited<br>Basel, Switzerland |
| [32] | Priority | Jan. 15, 1968 |
| [33] | | Switzerland |
| [31] | | 544/68 |

[54] STYRYL-NAPHTHALENE DERIVATIVES
10 Claims, No Drawings

[52] U.S. Cl..................................................260/240 CA,
8/65, 8/94.2, 8/94.4, 8/116.3, 106/169,
106/178, 117/33.5 T, 252/95, 252/97, 252/301.2
W, 260/75 R, 260/78 R, 260/240 D, 260/456 P,
260/456 R, 260/505 C, 260/515 R, 260/544 F,
260/556 AR, 260/558 R, 260/559 R, 260/606.5 P,
260/940, 260/952, 260/961

[51] Int. Cl........................................................ C09b 23/14

[50] Field of Search............................................ 260/240
CA, 240 D, 505 C, 507 A, 508, 515 R, 544 F, 456
P, 456 R, 556 AR, 558 R

[56] References Cited
UNITED STATES PATENTS

| 2,657,228 | 10/1953 | Hausermann et al. ........ | 260/508 X |
|---|---|---|---|
| 3,177,208 | 4/1965 | Stilz et al. ..................... | 260/240 |

OTHER REFERENCES

Heller, IRE Trans. Nucl. Sci. NS-9, No. 3, pages 52-3 (1962)

*Primary Examiner*—John D. Randolph
*Attorneys*—Harry Goldsmith, Joseph G. Kolodny, Bryant W. Brennan and Edward J. Sites ABSTRACT: The invention relates to new styryl-naphthalene derivatives which are useful as optical brighteners.

These new compounds are bis-styryl-naphthalenes containing in at least one of their ring systems at least one obligatory substitutent of the group consisting of a possibly functionally modified sulfonic acid group, a sulfone group, a possibly functionally modified carboxylic acid group and a nitrile group.

STYRYL-NAPHTHALENE DERIVATIVES

The present invention provides new styrylnaphthalene compounds which are colorless or at most of pale color and correspond to the formula (1)  A—CH=CH—B—CH=CH—A' in which B represents a naphthalene residue in which the residues A—CH=CH— and A'—CH=CH— are linked in positions 1,5 or 2,6 of the naphthalene ring system, in which formulae A and A', independently of each other, represent a benzene, naphthyl or diphenyl residue each, and at least one of the cyclic systems A, A' or B contains a at least one possibly functionally modified sulphonic acid group, a sulphone group, a possibly functionally modified carboxylic acid group or a nitrile group and may additionally contain one or several alkyl or alkoxy groups each containing up to 18 carbon atoms, halogen atoms or methylenedioxy groupings.

The compounds of the formula (1) may at most be of pale color and must therefore contain no chromophoric groups such as nitro groups, azo groups or anthraquinone residues. The two residues A and A' may be different, but preferably they are identical.

As the most essential feature of the present invention it should be emphasized that the compounds defined above contain in any desired position at least one or, for example, up to four, preferably two, of the above-mentioned obligatory substituents. When four such substituents are present, they are advantageously two identical pairs and arranged symmetrically. Thus, for example, the molecule may contain apart from two carboxylic acids groups, or preferably two sulphonic acid groups, also two nitrile groups. Sulphonic and carboxylic acid groups may be in the form of the free acid groups of the formula —$SO_3$-cation or COO-cation (the cation advantageously being hydrogen, alkali metal, alkaline earth metal or ammonium) and as correspondingly functionally modified groups such as sulphonic and carboxylic acid ester groups, preferably of alkyl ester groups with one to 18 carbon atoms in the alkyl residue, sulphonamide and carboxy amide groups; in the case of the acid amide groups a free $H_2N$-group or a mono- or dialkylamide group may contain one to 12, preferably one to four, carbon atoms in each alkyl group, or a morpholide group. The sulphone groups concerned are in the first place alkylsulphone groups containing one to four carbon atoms, such as methylsulphone or ethylsulphone.

Apart from these obligatory substituents the compounds defined above may contain other substituents, for example halogen atoms such as bromine or especially chlorine; alkoxy groups, especially those which contain one to four carbon atoms such as methoxy or ethoxy; alkyl groups containing at least two and at most 18, preferably at most four, carbon atoms such as ethyl, n-propyl, isopropyl, n-butyl, tertiary butyl or trifluoromethyl groups.

Of special value within the definition according to formula (1) are compounds corresponding to the formula (2) 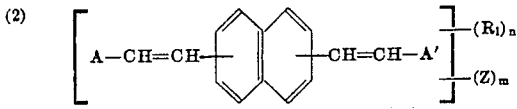

in which A and A', independently of each other, represent a benzene, naphthyl or diphenyl residue each, and the substituents —CH=CH—A and —CH=CH—A' are linked in the positions 1,5 or 2,6 of the naphthalene ring system, and $R_1$ is one of the substituents, attached to the residues A, A' or to the central naphthalene ring system, from the group comprising possibly functionally modified sulphonic or carboxylic acid group, sulphone or nitrile group, $n=$1, 2, 3 or 4; Z represents hydrogen, halogen, alkyl or alkoxy with up to 12 carbon atoms each, phenoxy, or phenylalkyl with one to four carbon atoms in the alkyl residue, and $m=$1, 2, 3 or 4.

Within the scope of this invention there are of special practical value the compounds of the formula (3) 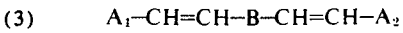 $A_1$—CH=CH—B—CH=CH—$A_2$ in which B represents a naphthalene residue in which the residues $A_1$—CH=CH— and $A_2$—CH=CH— are linked in positions 2,6 or 1,5 of the naphthalene ring system, in which $A_1$ and $A_2$ are identically or differently substituted benzene residues, and at least one of the cyclic systems $A_1$, $A_2$ or B contains one or two possibly functionally modified sulphonic acid groups, a sulphinic acid group, a sulphone group, a possibly functionally modified carboxylic acid group or a nitrile group, as well as one or several alkyl groups or alkoxy groups with up to 18 carbon atoms each, halogen atoms or methylenedioxy groups.

Among the compounds of the formulae (1) to (3) the variants listed below sub A to H are to value:

(A) Compounds of the formula (4) 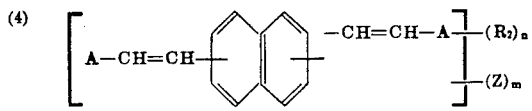

in which A represents a benzene residue and the substituents —CH=CH—A are linked in positions 1,5 or 2,6 of the naphthalene ring system, and $R_2$ represents a substituent, attached to the benzene residues A or the central naphthalene ring system, from the group: possibly functionally modified sulphonic or carboxylic acid group or nitrile group; $n=$1, 2, 3 or 4; Z represents hydrogen, halogen, alkyl or alkoxy each containing up to 12 carbon atoms, phenoxy, phenylalkyl with one to four carbon atoms in the alkyl residue, and $m=$1, 2, 3 or 4.

(B) Compounds of the formula (5) 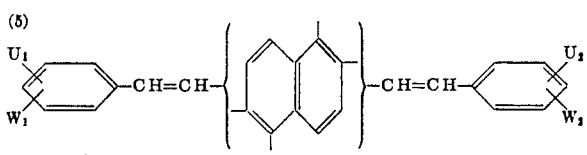

in which $U_1$ and $U_2$ each represents hydrogen, a possibly modified sulphonic acid group, a possibly functionally modified carboxylic acid group, a nitrile group, an alkylsulphone group or a phenylsulphone group, at least one of the symbols $U_1$ or $U_2$ has a meaning different from hydrogen and as indicated; $W_1$ and $W_2$ represents hydrogen, halogen, an alkyl or alkoxy group with one to eight carbon atoms, a possibly functionally modified sulphonic or carboxylic acid group or a nitrile group. The parentheses in the above formula indicate that the styryl residues may be in positions 1 or 2, or 5 or 6.

(C) Compounds of the formula (6) 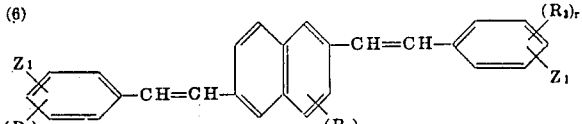

in which $R_3$ represents a sulphonic acid group or a salt thereof, a sulphonamide group or a substituted sulphonamide group, sulphonic acid ester group, alkylsulphone group, carboxylic acid group or a salt thereof, a carboxylic acid amide group or substituted carboxylic acid amide group, a carboxylic acid ester group or nitrile group; $p$, $q$ and $r$ each is 0, 1 or 2 and the sum $(p+q+r)=$1, 2, 3 or 4, and $Z_1$ represents hydrogen, halogen, alkyl or alkoxy with up to 12 carbon atoms.

(D) Compounds of the formula (7) 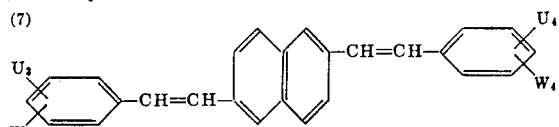

in which $U_3$ and $U_4$ each represents hydrogen, a carboxylic acid group, a carboxylic acid ester group, a carboxylic acid amide group, an alkylsulphone group, a sulphonic acid group, a sulphonic acid ester group, a sulphonamide group, or a nitrile group, and at least one of the symbols $U_3$ or $U_4$ has a meaning different from hydrogen and as indicated, and $W_3$ and $W_4$ represent hydrogen, halogen, alkyl or alkoxy each containing one to eight carbon atoms. The terms carboxylic acid group and sulphonic acid group include, of course, also their salts, among which the water-soluble salts such as alkali or ammonium salts deserve special mention.

(E) Compounds of the formula (8)

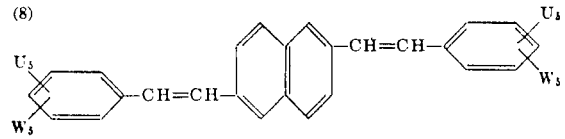

in which $U_5$ represents a sulphonic acid group or an alkali or alkaline earth metal salt thereof, an $-SO_2NH_2$ group or a substituted sulphonamide group with one or two aliphatic residues containing one to 12 carbon atoms or a morpholino group as substituents, a sulphonic acid phenyl ester group, an alkylsulphone group containing one to four carbon atoms, a carboxylic acid group or an alkali or alkaline earth metal salt thereof, a carboxylic acid alkyl ester group with one to four carbon atoms in the alkyl residue, a carboxylic acid amide, alkylamide or dialkylamide group with one to four carbon atoms in the alkyl residue, or the nitrile group, and $W_5$ represents hydrogen, a sulphonic acid ester group or an alkali or alkaline earth metal salt thereof, or an alkyl or alkoxy group with one to four carbon atoms.

(F) Compounds of the formula (9)

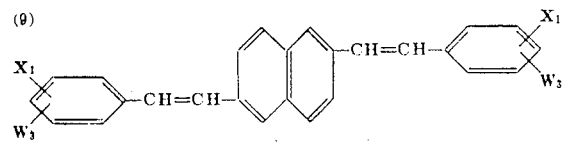

in which $X_1$ represents a sulphonic or carboxylic acid group, and $W_3$ represents hydrogen, halogen, alkyl or alkoxy with one to eight carbon atoms. The substituent $X_1$ is preferably in orthoposition or paraposition.

(G) Compounds of the formula (10)

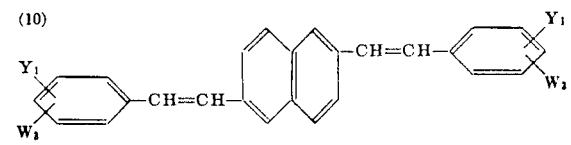

in which $Y_1$ represents the nitrile group, an alkylsulphone group, a sulphonic acid ester group, a sulphonamide group, a carboxylic acid ester group or a carboxyamide group, and $W_3$ represents hydrogen, halogen, alkyl or alkoxy, each with one to eight carbon atoms.

(H) Compounds of the formula (11)

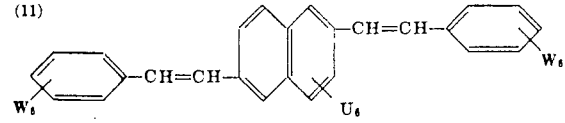

in which $W_6$ represents hydrogen, halogen or the nitrile group, and $U_6$ represents a sulphonic acid group or an alkali or alkaline earth metal salt thereof, an $-SO_2NH_2$ group, or a substituted sulphonamide group with one or two aliphatic residues containing one to 12 carbon atoms, or a morpholino group as substituents.

The styrylnaphthalene derivatives of the above formulae can be manufactured in analogy to known processes. For example, according to an advantageous manufacturing method compounds of the formulas

(12)    $Z_1$—B—$Z_1$    and
(13) A—$Z_2$    or
(14) $Z_2$—A' are reacted at a molecular ratio of 1:2, in which B represents a naphthalene residue which contains the substituents $Z_1$ linked in positions 1,5 or 2,6 of the naphthalene ring, and in which A and A' each represents a benzene residue defined above for the formula (1), a diphenyl residue or a naphthalene residue, preferably however a benzene residue; one of the symbols $Z_1$ or $Z_2$ is an O=CH— group and the other represents a grouping of one of the formulae

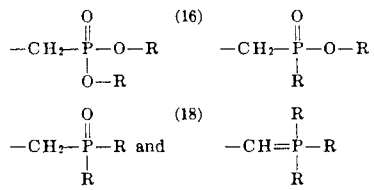

in which R represents a possibly further substituted alkyl radical, an aryl, cycloalkyl or aralkyl radical, and at least one of the cyclic systems present in the starting materials contains a possibly functionally modified sulphonic acid group, a sulphone group, a possibly functionally modified carboxylic acid group or a nitrile group, and, if desired, further reactions on these substituents are performed. It goes without saying that conversions of functional groups are, if desired, performed subsequently so as to arrive at the final products defined, for example esterification reactions, amidations and the like.

According to this process it is possible, for example, to react dialdehydes of the formula

(19)    O=CH—B—CH=O with monofunctional compounds of the formula

(20)    A—V or monoaldehydes of the formula

(21)    A—CHO with bifunctional compounds of the formula

(22)    V—B—V in which A and B have the above meanings and V represents one of the phosphoriferous substituents of the formula (15), (16), (17) or (18).

The phosphorus compounds of the formulae (20) and (22) needed as relevant starting materials are obtained in known manner by reacting halomethyl compounds, preferably chloromethyl or bromomethyl compounds of the formula

(23)    A—CH$_2$—halogen    or
(24)    halogen—CH$_2$—B—CH$_2$—halogen with
phosphorus compounds of the formula (25)

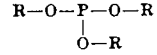

(26)

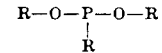

(27)

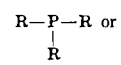

(28)

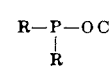

in which formulae R has the above meaning; residues R linked with oxygen are preferably lower alkyls, whereas residues R linked directly with phosphorus are preferably aryl such as benzene residues. The phosphorus compound of the formula (17) is also accessible by reacting a halomethyl compound, preferably a chloromethyl or bromomethyl compound of the formula (23) or (24) with P-chlorodiphenylphosphine and subsequent reaction with an alcohol of the formula R—OH (where R has the above meaning), for example with methanol or with water.

For the manufacture of compounds of the formula (3) the process variant is specially suitable in which compounds of the formula (12a)   Z′$_1$—B—Z′$_1$ are reacted at a molecular ratio of 1:2 with compounds of the formula A$_1$—CHO or A$_2$—COH in which B, A$_1$ and A$_2$ have the above meanings and Z′$_1$ represents a grouping of the formulae

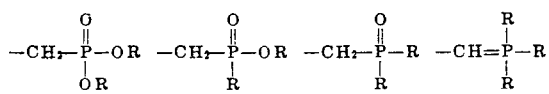

in which R represents a possibly substituted alkyl, cycloalkyl, aryl or aralkyl group.

In view of the very special importance or 2,6-naphthalene derivatives—revealed by several of the above formulas—those manufacturing processes which start from 2,6-substituted naphthalenes are likewise of special importance. According to an advantageous manufacturing process, for example, 1 mol of a naphthalene derivative of the formula

(29)
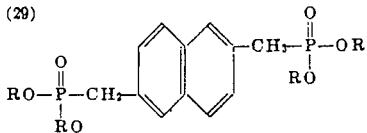

is reacted with about 2 mols of a compound of the formula (21) in the presence of a proton acceptor. In these formulae A and R have the meanings defined above.

The process is advantageously performed in an inert solvent, for example in a hydrocarbon such as toluene or xylene, or in an alcohol such as methanol, ethanol, isopropanol, butanol, glycols, glycol ethers such as 2-methoxyethanol, hexanols, cyclohexanol or cyclooctanol, or in an ether such as diisopropyl ether, tetrahydrofuran or dioxane, or in dimethylsulphoxide, formamide or N-methylpyrrolidone. Particularly suitable are polar, organic solvents such as dimethylformamide and dimethylsulphoxide. Some of the reactions can also be carried out in an aqueous solution.

Suitable proton acceptors are basic compounds such as alkali or alkaline earth metal hydroxides, alcoholates or amides, strongly basic amines and anion exchange resins in the hydroxyl form, preferably potassium hydroxide, potassium tertiary butylate or sodium methylate.

The reaction temperature depends on the kind of components and the proton acceptor concerned; in the practically acceptable cases it is from 10° to 100° C. The reactants are used as a rule in stoichiometric proportions, though in some cases an excess or a shortfall of one reactant or the other may be of advantage. In general, the reaction is exothermic so that it may become necessary to cool.

The compounds containing sulphonic acid groups are in most cases isolated in form of their sodium salts. When potassium hydroxide is used as condensing agent, they may alternatively be obtained in form of their potassium salts or as a mixture of the potassium and sodium salts. As naphthalene dialdehydes suitable for the manufacture of the new compounds defined above there may be mentioned, for example, the naphthalene-2,6-dialdehyde and the naphthalene-2,6dialdehydesulphonic acids. The latter are obtained by oxidation of 2,6-dimethylnaphthalene-3sulphonic acid, 2,6-dimethylnaphthalene-1-sulphonic acid, 2,6-dimethylnaphthalene-8-sulphonic acid or by sulphonation of naphthalene-2,6-dialdehyde with oleum.

The phosphorus compounds of naphthalene as defined under formula (22) may be, for example;
2,6-bis-diethoxyphosphonomethyl)-naphthalene and
2,6-bis-(dimethoxyphosphonomethyl)-naphthalene.

Suitable monofunctional compounds corresponding to formula (20) are, for example:
4-Carbomethoxybenzylphosphonic acid diethyl ester,
4-carbethoxybenzylphosphonic acid diethyl ester,
4-cyanobenzylphosphonic acid dimethyl ester,
3-cyanobenzylphosphonic acid dimethyl ester,
2-cyanobenzylphosphonic acid dimethyl ester.

Suitable monoaldehydes of formula (21) are, for example:
Benzaldehyde-2-sulphonic acid
4-carbethoxybenzaldehyde
4-cyanobenzaldehyde,
benzaldehyde-4-carboxylic acid
benzaldehyde-4-sulphonic acid,
4-carbomethoxybenzaldehyde,
2-cyanobenzaldehyde,
3-cyanobenzaldehyde,
benzaldehyde-2,4-disulphonic acid.

The following compounds can be manufactured by the process described above and with the use of the said starting materials or of their analogues:

(108)
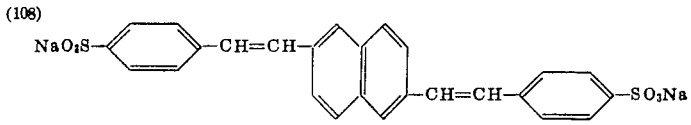

(133)
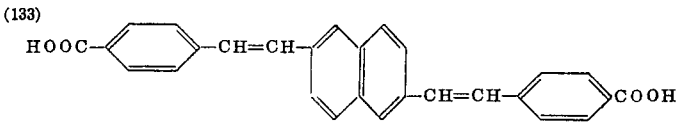

(129)
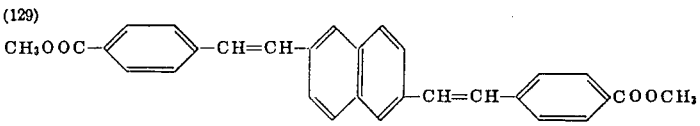

(131)
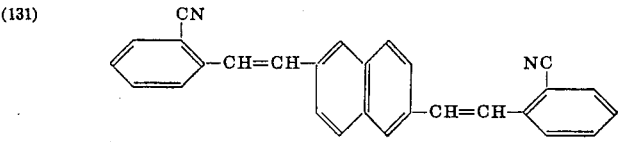

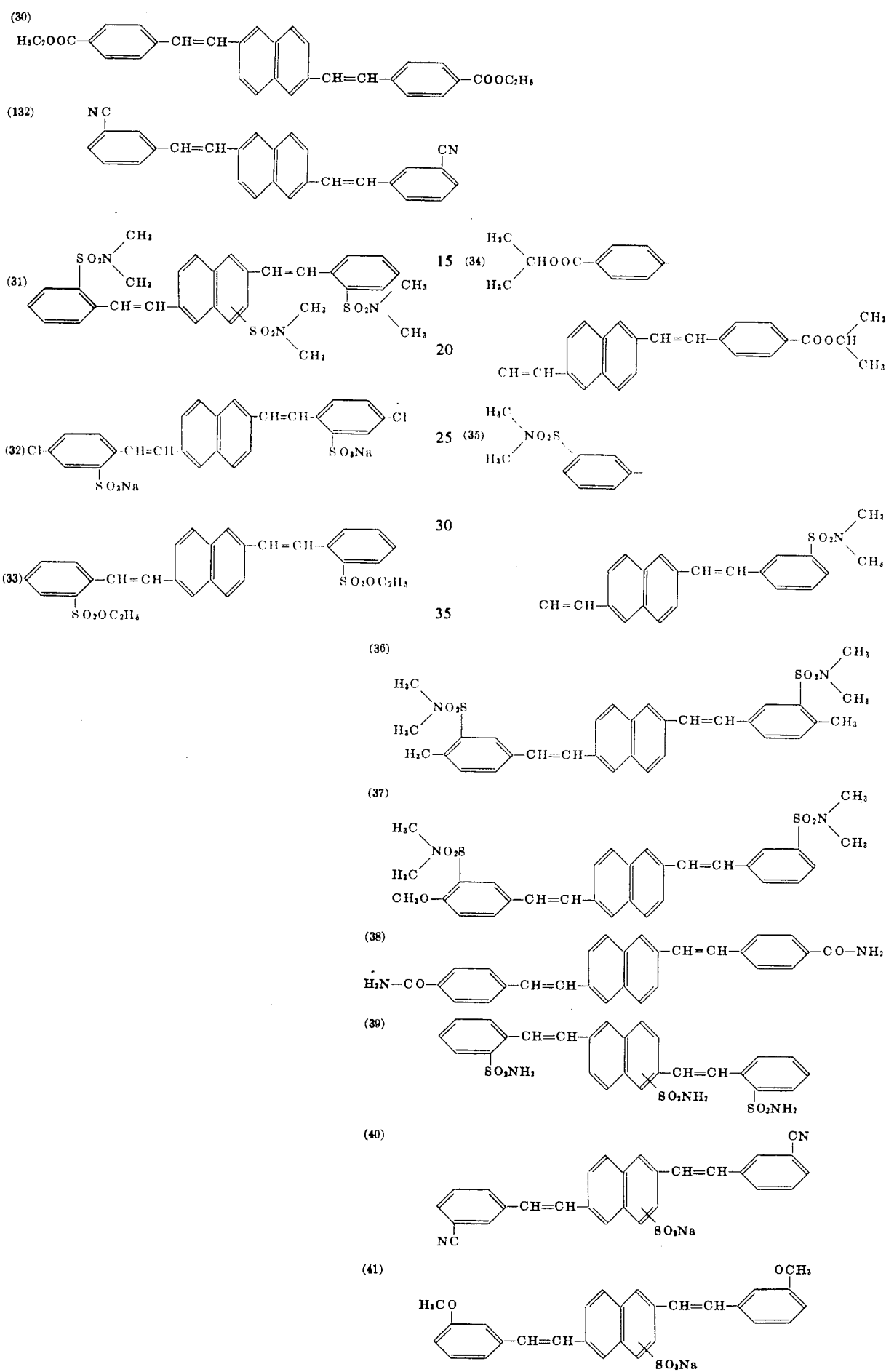

(42) 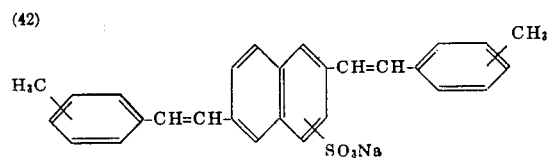
(43) 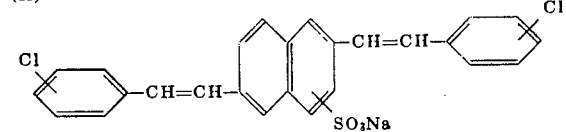
(44) 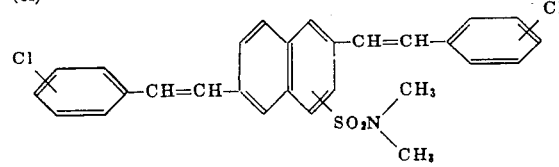
(45) 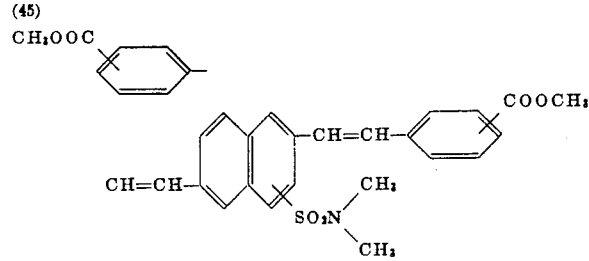
(46) 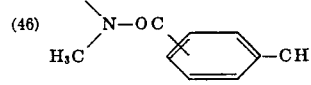
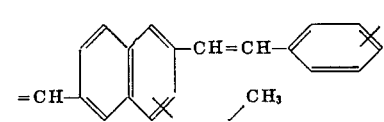
(47) 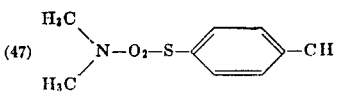
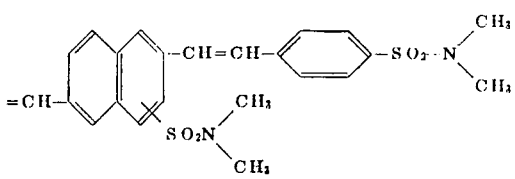
(48) 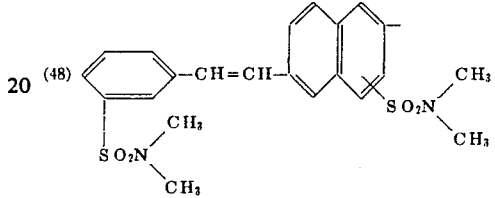
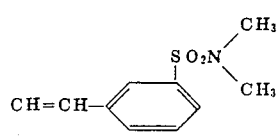
(49) 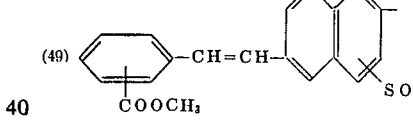
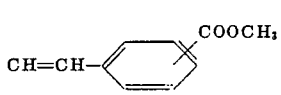
(50) 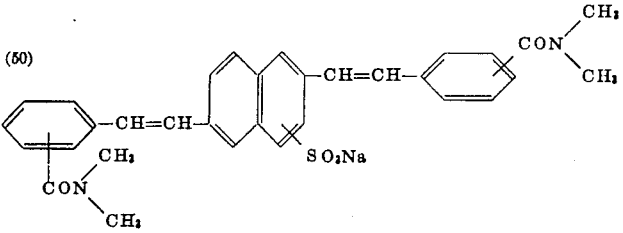
(51) 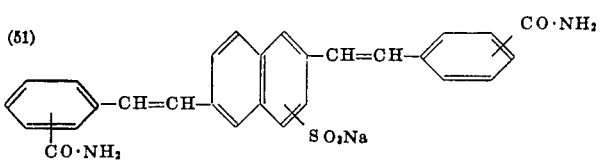
(52) 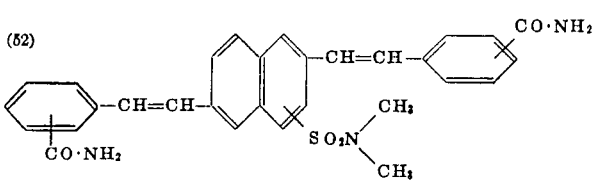

(53) 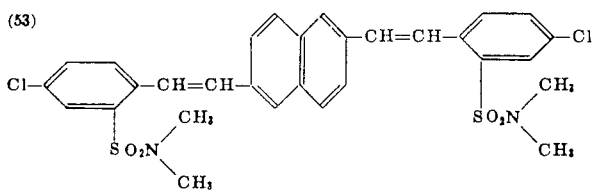

The new compounds of the formula (1) possess in the dissolved or finely disperse state a remarkable fluorescence. They can be used for optically brightening a wide variety of organic materials of high or low molecular weight or of materials containing organic substances.

The following relevant groups of organic materials, insofar as they are suitable for brightening, may be mentioned as examples:

I. Synthetic organic materials of high or higher molecular weight such as a. Polymerization products based on organic compounds containing polymerizable carbon-to-carbon double bonds, that is to say their homopolymers or copolymers as well as their aftertreating products (for example cross-linking, grafting or decomposition products; diluted polymers) and the like, for example:

polymers based on $\alpha,\beta$-unsaturated carboxylic acids, especially of acrylic compounds, of olefinic hydrocarbons, (especially poly-$\alpha$-olefins), polymers based on vinyl and vinylidene compounds of halogenated hydrocarbons, of unsaturated aldehydes, ketones and allyl compounds, their graft polymers or cross-linked products (for example bifunctional or polyfunctional cross-linking agents) or products accessible by partial degradation, modification of reactive groupings or the like;

b. other polymers as obtained, for example, by ring opening, for instance polyamides of the polycaprolactam type, also formaldehyde polymers, or polymers accessible both by polyaddition and polycondensation, such as polyethers, polythioethers, polyacetals or thioplasts;

c. polycondensates or precondensates based on bifunctional or polyfunctional compounds with condensable groups, their homo- and cocondensates as well as after treating products, for example:

polyesters, saturated (especially aromatic esters such for instance as polyethylene terephthalate) or unsaturated (for example maleic acid + dialcohol polycondensates and their cross-linked products with copolymerizable vinyl monomers), linear or branched (for example alkyl resins), polyamides (for example hexamethylenediamine adipate), maleinate resins, melamine resins, phenol resins (novolaks), aniline resins, furan resins, carbamide resins and their precondensates and similarly constituted products, polycarbonates, silicone resins;

d. polyadducts such as polyurethanes (cross-linked or not), epoxy resins.

II. Semisynthetic organic materials, for example cellulose esters and mixed esters (acetate, propionate), nitrocellulose, cellulose ethers, regenerated cellulose (viscose, cuprammonium rayon) or their after-treated products, casein plastics.

III. Natural organic materials of animal or vegetable origin, for example those based on cellulose or proteins such as wool, cotton, silk, bast, jute, hemp, furs and hairs, leathers, finely dispersed wood pulp, natural resins (such as colophony, especially lacquer resins), also rubber, gutta percha, balata and their after-treated and modified products, degradation products, products accessible by modification of reactive groups.

The organic materials concerned may be at widely differing stages of their processing (raw materials, semifinished products or finished products) and physical states. They may be in the form of products shaped in a wide variety of ways, that is to say, for example, as predominantly three-dimensional objects such as panels, sections, injection moldings or components of a great variety, chips or granules; predominantly two-dimensional flat materials such as films, foils, lacquers, impregnations or coatings, or predominantly unidimensional materials such as filaments, fibers, flocks or wires. The said materials may also be in unshaped states in a wide variety of homogeneous or inhomogeneous forms of distribution and physical states, for example in the form of powders, solutions, emulsions, dispersions, latices, sols, gels, putties, pastes, waxes, adhesives or sealing or grouting compositions, and the like.

Fibrous materials may be, for example, monofils, staple fibers, flocks, hanks, yarns, fiber fleeces, felts, padding, flocculated materials or as woven textile fabrics or textile laminates, knitwear, papers, cardboards, paper pulps and the like.

The compounds to be used according to this invention are also of value for the treatment of organic textile materials, especially woven textile fabrics; when substrates such as those mentioned are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycol ethers of aliphatic alcohols, fat amines or alkylphenols, cellulose waste liquor or condensates of (possibly alkylated) naphthalene sulphonic acids with formaldehyde. It has been found particularly advantageous to work in a neutral, weakly alkaline or acid bath. Likewise, it is advantageous to perform the treatment at a temperature from about 50° to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of films or other shaped structures they may be added to the molding or injection molding composition etc. or they may be dissolved, dispersed or in any other way finely distributed in the spinning mass before spinning. The optical brighteners may also be added to the starting materials, reaction mixtures or intermediate products used to produce fully synthetic or semisynthetic organic materials, that is to say also before or during the chemical reaction, e.g. a polycondensation (including the precondensates), a polymerization (including the prepolymers) or a polyaddition.

The new optical brighteners are in general distinguished by their good heat resistance and fastness to light and to migration, their good brightening power, as well as by their great stability towards hypochlorite.

The amount of the new optical brightener to be used according to this invention, referred to the weight of the material to be optically brightened, may vary within wide limits. Even very small amounts, in some cases for instance as little as 0.001 percent by weight, may suffice to produce a distinct and durable effect, though it is also possible to use amounts of up to about 0.5 percent by weight or more. For most practical purposes an amount ranging from 0.01 to 0.2 percent by weight will be used.

The new compounds, to be used as brightening agents, may also be applied, for example, as follows:

a. In admixture with dyestuffs or pigments or as additives to dyebaths, or printing, discharge or reserve pastes. Also for aftertreating dyeings, prints or discharge prints.

b. In admixture with so-called "carriers," antioxidants, light filters, heat stabilizers, chemical bleaches or as additives to bleaching baths.

c. In admixture with cross-linking agents, dressings such as starch or synthetic dressings. It may also be of advantage to add the products of this invention to the liquors used for producing an anticrease finish.

d. In combination with detergents. The detergent and the optical brightener may be added separately to the washing liquor. It is also advantageous to use detergents that as such already contain a share of brightening agent. Suitable detergents are e.g. soaps, salts of sulphonate washing agents, e.g. of sulphonated benzimidazoles substituted on the carbon atom 2 by higher alkyl radicals, also salts of monocarboxylic acid esters of 4-sulphophthalic acid with higher aliphatic alcohols, also salts of aliphatic alcohol sulphonates alkylarylsulfonic acids or condensation products of higher fatty acids with aliphatic hydroxysulphonic or aminosulphonic acids. Furthermore, there may be used nonionic detergents e.g. polyglycol ethers derived from ethylene oxide and higher aliphatic alcohols, alkylphenols or fatty amines.

e. In combination with polymeric vehicles (polymers, polycondensates or polyadducts) in which the brightening agent, if desired in addition to other substances, is incorporated in the dissolved or dispersed form, for example in the case of coatings, impregnating or binding agents (solutions, dispersions, emulsions) for textile materials, fleeces, papers or leathers.

f. As additives to a wide variety of industrial products to improve their presentation or to obviate disadvantages in their use, for example as additives to glues, adhesives, paints or the like.

g. In combination with other optical brighteners, to even out shades and/or to achieve a synergistic effect.

The compounds of the above formula can be used as scintillators for various photographic purposes, such as electrophotographic reproduction or for supersensitizing.

If the brightening operation is to be combined with other treating or improving operations, the combined treatment is advantageously performed with the use of a suitable stable preparation which contains in addition to optically brightening compounds of the above general formula also dispersants, detergents, carriers, dyestuffs, pigments or dressing agents.

Analysis: $C_{26}H_{18}Na_2O_6S_2$
calculated: C 58.20  H 3.38  S 11.95
found: C 58.05  H 3.62  S 11.89

The 2,6-bis-(diethoxyphosphonomethyl)-naphthalene used as starting material is accessible thus:

47.1 g. of 2,6-bis-(bromomethyl)-naphthalene [prepared by reacting 2,6-dimethylnaphthalene with N-bromosuccinimide in carbon tetrachloride] in 150 ml. of xylene is slowly introduced at the boil into 100 ml. of triethylphosphite. The resulting colorless, clear solution is heated for 8 hours at the reflux temperature in such a manner that the ethylbromide formed can pass over.

The reaction mixture is cooled to 10° C., the product which has crystallized out is suctioned off, washed with a small quantity of xylene and dried under vacuum at 60°–65° C. Yield: about 59 g. 90.3 percent of theory) of 2,6-bis-(diethoxyphosphonomethyl)-naphthalene of the formula (102) 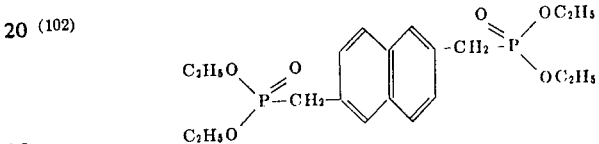

White crystal powder melting at 143° to 144° C.

Analysis: $C_{20}H_{30}O_6P_2$
calculated: C 56.07  H 7.06  P 14.46
found: C 55.94  H 7.04  P 14.09

When the compound of the formula (101) is dissolved in distilled water and barium chloride or calcium chloride is added, the corresponding barium and calcium salt respectively are obtained which correspond to the formulae (103) 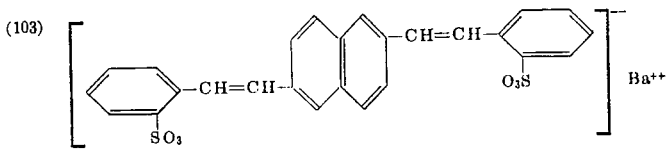

(104) 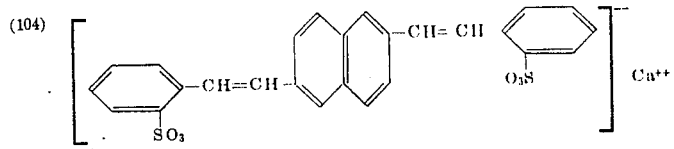

EXAMPLE 1

While stirring a suspension of 25.5 g. of powdered potassium hydroxide (of about 88 percent strength) in 120 ml. of anhydrous dimethylformamide at 40° to 45° C., it is mixed within 15 minutes dropwise with a solution of 21.4 g. of 2,6-bis-(diethoxyphosphonomethyl)-naphthalene and 32.7 g. of the sodium salt of benzaldehyde-2-sulfonic acid containing about 70 percent of free sulfonic acid in 50 ml. of anhydrous dimethylformamide. The reaction mixture is stirred on for 2½ hours at 40°–45° C. and then poured into 2.5 liters of cold water. The resulting light-yellow, turbid solution is heated to the boil, mixed with 500 g. of sodium chloride, cooled to 20° and the yellow precipitate is suctioned off, dissolved in 2 liters of boiling ethanol, while still hot the insoluble residue is filtered off; the filtrate is mixed with 10 g. of active carbon, once more filtered hot and then allowed to crystallize. Yield: about 10.6 g. (=39.6 percent of theory) of the compound of the formula (101) 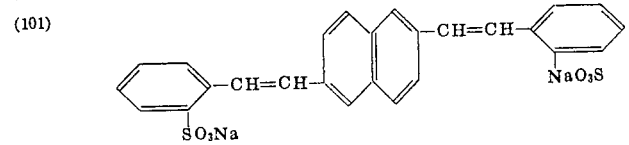

EXAMPLE 2

A homogeneous mixture of 7.1 g. of 2,6-bis-(dimethoxyphosphonomethyl)-naphthalene of the formula (105) 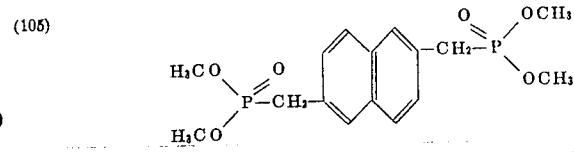

and 10.4 g. of the sodium salt of benzaldehyde-2-sulphonic acid, having a strength corresponding to about 88 percent of free sulphonic acid, is added within about 10 minutes to a well-stirred suspension of 12.3 g. of powdered potassium hydroxide (of about 91 percent strength) in 50 ml. of dimethylsulphoxide, with the temperature of the reaction mixture rising to about 40° C. During the whole of the reaction the air in the reaction vessel is displaced by a current of nitrogen.

The batch is stirred on for 3 hours at 40° to 45° C., then poured into one-half liter of distilled water heated to about 70° C.; the yellow, slightly turbid solution is mixed with 50 g. of sodium chloride, cooled to 20° C. and adjusted to a pH value of 7 by adding about 13 ml. of concentrated hydrochloric acid. The product obtained in small crystal needles is suctioned off, washed with a salt sol (50 g. of sodium chloride in one-half liter of distilled water) and dried under vacuum. Yield: 7.0 g.; NaCl content: 11.2 percent, corresponding to 6.2 g. (=46.3 percent of theory) of the compound of the formula (101).

On recrystallization from ethanol 4.8 g. of the compound of the formula (101) are obtained in light-yellow, small fine needles.

The 2,6-bis-(dimethoxyphosphonomethyl)-naphthalene used as starting material can be prepared thus:

15.7 g. of 2,6-bis-bromomethylnaphthalene and 18.6 g. of trimethylphosphite are heated within about 30 minutes to 105° C., whereupon the bis-bromomethylnaphthalene dissolves and the temperature of the solution rises to 158° C. within a few minutes, and 7.7 g. of methylbromide are eliminated. The yellowish solution is stirred on for a short time, then allowed to cool, 30 ml. of carbon tetrachloride are added at 75° C. and the batch is allowed to crystallize. The product is suctioned off, washed with carbontetrachloride and dried, to yield 13.6 g. (96.5 percent of theory) of 2,6-bis-(diemthoxyphosphonomethyl)-naphthalene of the formula (105) in form of almost colorless crystals melting at 145°–147° C. After two recrystallizations from toluene large, agglomerated crystals melting at 148°–150° C. are obtained.

EXAMPLE 3

A well-stirred suspension of 252 g. of powdered potassium hydroxide (of about 89 percent strength) in 1 liter of anhydrous dimethylformamide is mixed within 10 minutes—while displacing the air by a current of nitrogen—with a homogeneous mixture of 214 g. of 2,6-bis-(diethoxyphosphonomethyl)-naphthalene and 211 g. of the sodium salt of benzaldehyde-2sulphonic acid of a strength corresponding to 88 percent of free sulphonic acid, during which the temperature is maintained at 40° to 45° C. by ice cooling. The batch is stirred on for 3 hours at 40° to 45° C., then poured into 7 liters of distilled water of about 70° C., and then 3 kg. of sodium chloride and 3 kg. of ice are added. The batch is stirred for about 2 hours at room temperature, the product which has crystallized out is suctioned off and recrystallized from 4 liters of boiling distilled water, a small insoluble residue being filtered off. There are obtained about 202 g. of the compound of the formula (101) in the form of yellow, fine needles, corresponding to a yield of 75 percent of the theoretical.

EXAMPLE 4

21.4 g. of 2,6-bis-(diethoxyphosphonomethyl)-naphthalene and 38.8 g. of the disodium salt of benzaldehyde-2,4disulphonic acid, having a strength corresponding to about 70 percent of free sulphonic acid, are reacted in 400 ml. of anhydrous dimethylformamide and 24.5 g. of powder potassium hydroxide (of about 89 percent strength) according to example 3. After 2 hours' reaction 400 ml. of distilled water are dropped into the well cooled reaction mixture. The resulting turbid solution is clarified by filtration, the clear filtrate is mixed with 1.6 liters of ethanol, heated to the boil and allowed to cool, whereupon the product crystallizes out in small, fine needles. The resulting product is once more dissolved in 200 ml. of hot distilled water, mixed with 600 ml. of ethanol, brought to the boil, clarified by filtration, allowed to crystallize and dried under vacuum at 80° to 90° C., to yield about 10.7 g. of the compound of the formula (106)

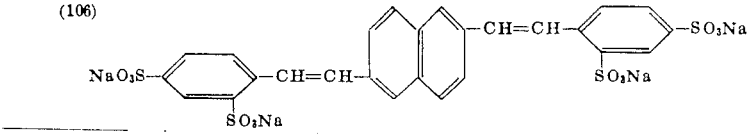

as a yellow crystal powder.

Analysis: $C_{26}H_{16}Na_4O_{13}S_4 \cdot 1\frac{1}{2} H_2O$
calculated:   C 40.68   H 2.49   S 16.71
found:        C 40.43   H 2.39   S 16.61

The compounds of the formula (107)

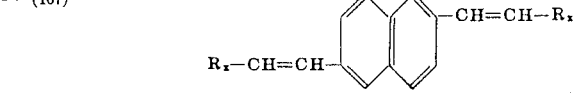

listed in the following table I can be prepared in a manner similar to that described in the preceding examples.

The sodium salt of 5-formyl-2-methylbenzenesulphonic acid, used as starting material for the compound of the formula (109), is accessible by sulphonation of 4-methylbenzaldehyde with oleum containing 66 percent of sulphur trioxide and purification via the barium salt. In an identical manner the 5-formyl-2-methoxybenzenesulphonic acid, used as starting material for the compound of the formula (110), is obtained from 4-methoxybenzaldehyde.

TABLE I

| Number: | $R_1$ | Colour of powder |
|---|---|---|
| 108 | —⟨C₆H₄⟩—SO₃Na | Light-yellow. |
| 109 | —⟨C₆H₃⟩(CH₃)(SO₃Na) | Pale-yellow. |
| 110 | —⟨C₆H₃⟩(OCH₃)(SO₃Na) | Light-yellow. |
| 111 | —⟨C₆H₄⟩—SO₃Na | Greenish-yellow. |

EXAMPLE 5

150 g. of the compound of the formula (101) in 1 liter of anhydrous chlorobenzene are stirred and heated within 35 minutes to 90° C. while adding 500 ml. of thionylchloride and 2 ml. of dimethylformamide, and then stirred for 4 hours at 90° to 100° C., then cooled; the resulting crystalline product is suctioned off and recrystallized from 2 liters of o-dichlorobenzene with addition of 50 ml. of thionylchloride, and then clarified by filtration through a glass suction filter.

Yield: about 104.2 g. (=70.7 percent of theory) of the compound of the formula (112)

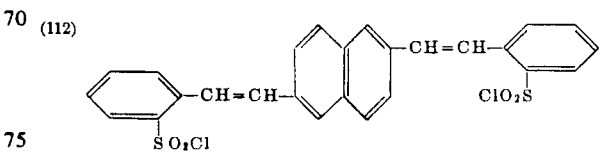

as a yellow crystal powder melting at 262° C. with decomposition.

In a similar manner the sulphochloride of the formula (113)

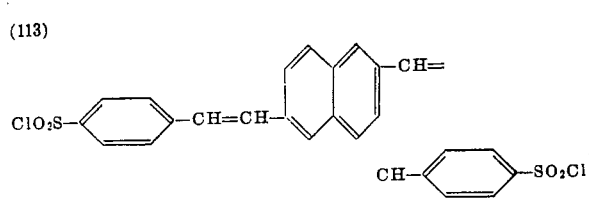

can be prepared from the compound of the formula (108); it forms a yellow crystal powder melting above 300° C.

EXAMPLE 6

5.3 g. of the compound of the formula (112) are suspended in 200 ml. of anhydrous chlorobenzene with stirring. Then a moderate current of methylamine is introduced, the temperature raised within 15 minutes to 54° C., and for 2 hours at 54° 60° C. methylamine is injected. After cooling the batch, the product is suctioned off, washed with methanol and water and twice recrystallized from about 700 ml. of chlorobenzene.

Yield: About 3.4 g. (=65.6 percent of theory) of the compound of the formula (114)

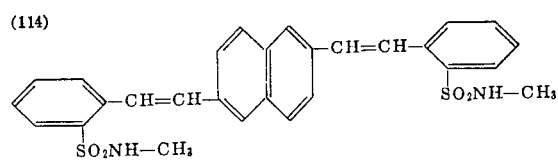

in light-yellow, small needles melting at 251°–252° C.

Analysis: $C_{28}H_{26}N_2O_4S_2$
calculated:  C 64.84  H 5.05  N 5.40  S 12.36
found:      C 64.69  H 5.14  N 5.45  S 12.26

When, instead of methylamine, dry ammonia gas is injected for 4 hours, and chlorobenzene is replaced by absolute ethanol as solvent, and the resulting product is recrystallized from dimethylformamide + water, there are obtained about 4.2 g. (=85.8 percent of theory) of the compound of the formula (115)

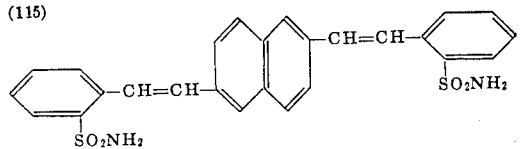

in form of a yellow powder melting above 300° C.

EXAMPLE 7

5.3 g. of the compound (112) in 150 ml. of ethanol and 20 mols of 3-methoxypropylamine are stirred under reflux for 5 hours. Then 100 ml. of water are added, the whole is cooled, and the crystalline product is suctioned off and recrystallized from 1 liter of ethanol.

yield: 4.7 g. (= 74.2 percent of theory) of the compound of the formula (116)

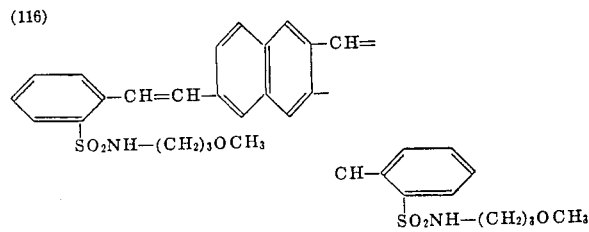

in form of yellow, glossy platelets melting at 146°–147° C.

Analysis.—$C_{34}H_{38}N_2O_6S_2$: Calculated: C, 64.33; H, 6.03; N, 4.41; S, 10.10. Found: C, 64.21; H, 6.11; N, 4.44; S 10.34.

EXAMPLE 8

5.3 g. of the compound (112) in 150 ml. of n-octylamine are stirred and heated for 1 hour at 80°–85° C., then 600 ml. of ethanol are added, the whole is cooled, and the resulting product is suctioned off and recrystallized from 1 liter of ethanol.

Yield: about 5.7 g. (=79.7 percent of theory) of the compound of the formula (117)

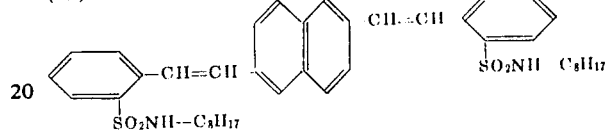

in small, yellow needles melting at 120°–121° C.

Analysis: $C_{42}H_{54}N_2O_4S_2$
calculated:    C 70.55  H 7.61  N 3.92  O 8.95  S 8.97
    found:    C 70.42  H 7.70  N 3.93  O 8.96  S 8.89.

The compounds of the general formula (107) listed in the following table II, in which $R_x$ has the meaning shown in the table, are accessible in a similar manner:

TABLE II

| Number | $R_x$ | M.P. in ° C. |
|---|---|---|
| 118 | —C₆H₄—SO₂NH—(CH₂)₃—N(CH₃)₂ | 161–162 |
| 119 | —C₆H₄—SO₂N(CH₂—CH₂OH)₂ | 241–242 |
| 120 | —C₆H₄—SO₂NH—CH₂—CH₂OH | 262–263 |
| 121 | —C₆H₄—SO₂—N(morpholino) | 254–255 |
| 122 | —C₆H₄—SO₂—N(CH₃)₂ | 229–231 |

EXAMPLE 9

5.3 g. of the compound (112) are slowly added at 0° to 5° C. to a solution of 3.8 g. of phenol in 100 ml. of anhydrous pyridine. The batch is stirred for 4 hours at 0° to 5° C., then slowly heated to 90° C. and stirred for 1 hour at 90° to 95° C. Then 100 ml. of water are added, the whole is cooled, and the product suctioned off and recrystallized from aqueous dioxane. After drying at 80° to 85° C. under vacuum, 1.6 g. of the compound of the formula (123)

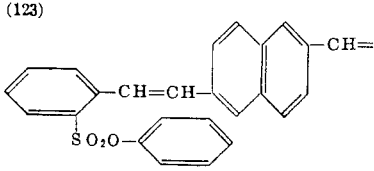

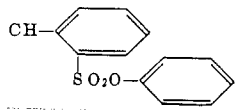

are obtained in form of a yellow crystalline powder melting at 228°–229° C.

Analysis: C₃₀H₂₀O₆S₂
calculated: C 70.79  H 4.38  S 9.95
found:      C 70.63  H 4.37  S 9.98

EXAMPLE 10

26.4 g. of the compound (112) with 0.5 of a wetting agent (reaction product of ethylene oxide with p-tertiary octylphenol) are finely suspended in 50 ml. of water and the suspension is stirred into a solution of 50.4 g. of sodium sulphite hydrate (Na₂SO₃.7H₂O) in 500 ml. of water. The mixture is heated to 95°–98° C. and the pH value is kept constant between 9 and 10 by dropping in a total of 15 ml. of a 30 percent aqueous sodium hydroxide solution. After stirring for 6 hours the hot solution is filtered, cooled and the crystalline product is suctioned off and further worked up while still moist. Recrystallization from ethanol furnishes the disodium salt of the disulphonic acid of the formula (124)

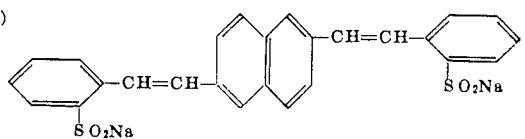

in form of fine, pale-yellow flakes melting above 300° C.

12.5 g. of the slightly moist disodium salt of the disulphonic acid of the formula (124) are refluxed for about 22 hours with 14.1 g. of methyliodide in 300 ml. of ethanol with addition of 1.5 g. of anhydrous sodium carbonate. After cooling, the product is suctioned off, washed with 250 ml. of water, dissolved in 100 ml. of dimethylformamide, clarified by filtration, and the hot, clear solution is mixed with 50 ml. of ethanol and cooled.

The resulting crystalline product of the formula (125)

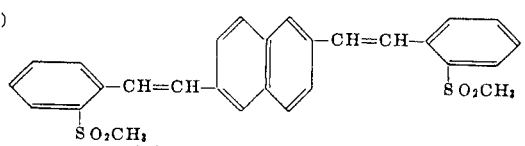

(a yellow crystalline powder) is suctioned off and dried at 80°–85 C. under vacuum. It melts at 277°–278° C.

Analysis: C₃₀H₂₄O₆S₂
calculated: C 68.83  H 4.95  S 13.12
found:      C 68.45  H 5.01  S 12.95.

EXAMPLE 11

A homogeneous mixture of 10.7 g. of 2,6-bis-(diethoxyphosphonomethyl)-naphthalene of the formula (102) and 7.85 g. of p-cyanobenzaldehyde is added portionwise within 20 minutes to a suspension of 12.7 g. of powdered potassium hydroxide (containing about 12 percent of water) in 100 ml. of dimethylformamide. The temperature of the reaction mixture rises during the addition from 22° to 37° C. On completion of the addition the batch is stirred on for 2½ hours at 40° to 45° C., then cooled to 15° C. and 200 ml. of water are dropped in while cooling thoroughly. The precipitated product is filtered off, washed with water and dried at 80° to 85° C. under vacuum.

Yield: about 9.3 g. (=97.5 percent of theory) of the compound of the formula (126)

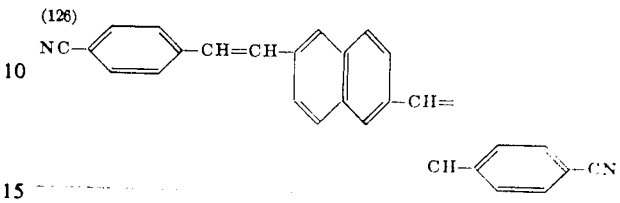

as a light-yellow, crystalline powder melting at 262°–262.5° C. After two recrystallization from o-dichlorobenzene with the aid of bleaching earth there are obtained about 5.9 g. (=61.7 percent of theory) of light-yellow, small fine needles melting at 273.5°–274° C.

Analysis: C₃₀H₂₀N₂
calculated: C 87.93  H 4.74  N 7.33
found:      C 87.69  H 4.89  N 7.21.

EXAMPLE 12

A homogeneous mixture of 4.2 g. of 2,6-bis-(diethoxyphosphonomethyl)-naphthalene of the formula (102) and 4.3 g. of benzaldehyde-sulphonic acid-(4)-dimethylamide is added portionwise to a suspension of 5.3 g. of powdered potassium hydroxide (of 89 percent strength) in 100 ml. of dimethylformamide with stirring and exclusion of air, during which the temperature of the reaction mixture rises to 45° C. The batch is stirred on for 2 hours at 40° to 45° C., then cooled to 15° C., and, while cooling, 100 ml. of water are dropped in. The precipitated product is suctioned off, washed with ½liter of water and 250 ml. of methanol, and twice recrystallized from dimethylformamide.

Yield: about 3.2 g. (=58.6 percent of theory) of the compound of the formula (127)

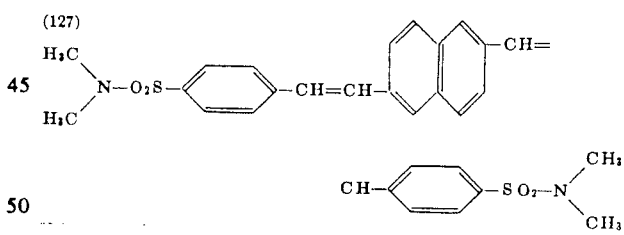

in the light-yellow flakes melting above 300° C.

*Analysis.*—C₃₀H₃₀N₂O₄S₂: Calculated: C, 65.91; H, 5.53; N, 5.12; S, 11.73. Found: C, 65.87; H, 5.60; N, 5.14; S, 11.06.

In a similar manner, with the use of benzaldehyde-sulphonic acid-(4)-methylamide, the compound of the formula (128)

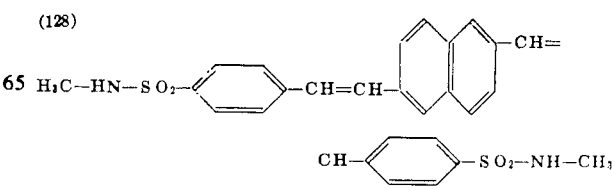

can be obtained in form of a light-yellow powder melting above 300° C.

*Analysis.*—C₂₈H₂₆N₂O₄S₂: Calculated: C, 64.84; H, 5.05; N, 5.40; S, 12.36. Found: C, 64.86; H, 4.93; N, 5.22; S, 12.57.

EXAMPLE 13

42.8 g. of 2,6-bis-(diethoxyphosphonomethyl)-naphthalene of the formula (102) and 32.8 g. of benzaldehyde-4-carboxylic acid methyl ester are stirred at 25° C. into 300 ml. of dimethylsulphoxide. Then, while excluding air, 80 g. of a 15 percent solution of sodium methylate in methanol is dropped in within 10 minutes, during which the temperature of the reaction mixture rises to about 45° C. The batch is stirred on for 1 hour, during which the temperature gradually drops to 29° C. Then 400 ml. of methanol are added, the product is suctioned off and washed with water and methanol, and recrystallized from 11 liters of dimethylformamide.

Yield: about 30.8 g. (=68.6 percent of theory) of the compound of the formula

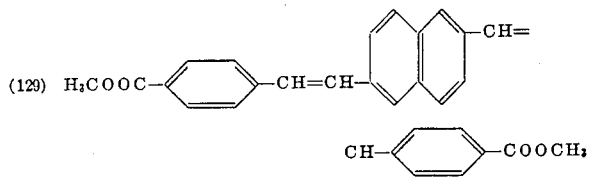

in pale-yellow flakes melting above 300° C.

Analysis: $C_{30}H_{24}O_4$
calculated: C 80.33  H 5.39.
found: C 80.01  H 5.27.

EXAMPLE 14

A suspension of 12.6 g. of powdered potassium hydroxide (of about 89 percent strength) in 50 ml. of dimethylformamide is mixed, while being stirred under exclusion of air, with a suspension of 4.6 g. of naphthalene-2,6-dialdehyde and 12.7 g. of 1-diethoxyphosphonomethyl-2-cyanobenzene of the formula

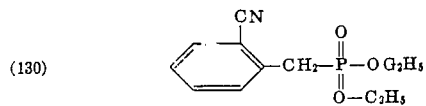

in 50 ml. of dimethylformamide so that the temperature of the reaction mixture can be kept below 45° C. by cooling with an ice bath. The batch is stirred on for 2 hours at 40° to 45° C., cooled, while cooling 100 ml. of water are added, and the product is suctioned off, washed with water and methanol and twice recrystallized from o-dichlorobenzene with the aid of bleaching earth.

Yield: about 6.5 g. (=68.1 percent of theory) of the compound of the formula

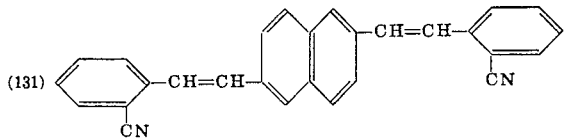

in light-yellow, shiny flakes melting at 270°–271° C.

Analysis: $C_{26}H_{16}N_2$
calculated: C 87.93  H 4.74  N 7.33
found: C 87.71  H 4.73  N 7.37.

In an analogous manner, using 1-diethoxyphosphonomethyl-3-cyanobenzene, the compound of the formula

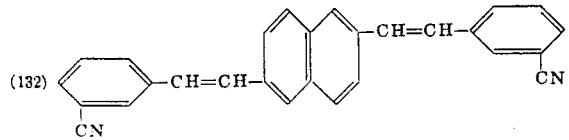

is obtained as a light-yellow powder melting at 288°–289° C.

Analysis: $C_{26}H_{16}N_2$
calculated: C 87.93  H 4.74  N 7.33
found: C 87.78  H 4.83  N 7.32.

EXAMPLE 15

11.2 g. of the compound of the formula (129) in 500 ml. of methylcellosolve are stirred and heated to 95° C. and 50 ml. of a 30 percent aqueous sodium hydroxide solution are dropped in. The mixture is stirred on for 5 hours at 90° to 100° C., cooled, and the product is suctioned off, washed with water and methanol, then twice boiled with 500 ml. of trichlorobenzene and filtered while still hot. The adhering trichlorobenzene is removed with methanol and the product in a mixture of 500 ml. of water and 100 ml. of hydrochloric acid of about 36 percent strength is refluxed for 30 minutes, then cooled, and the product is suctioned off, washed neutral with water and dried at 80° to 85° C. under vacuum.

Yield: 6.0 g. (=57.1 percent of theory) of the compound of the formula

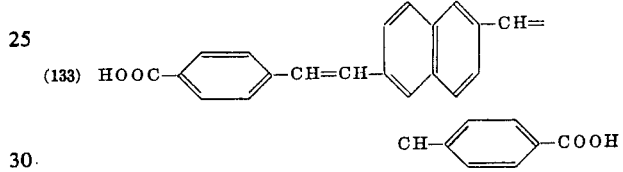

as a yellow powder melting above 300° C.

EXAMPLE 16

13.0 g. of the compound of the formula (129) in 500 ml. of methylcellosolve are stirred and heated to 95° C.; then 50 ml. of a 30 percent aqueous sodium hydroxide solution are dropped in and the whole is heated for 6 hours at 90° to 100° C., then cooled, and the product is suctioned off, washed with a little water and dried at 80° to 85° C. under vacuum, to yield about 13.2 g. (=98.1 percent of theory) of the compound of the formula

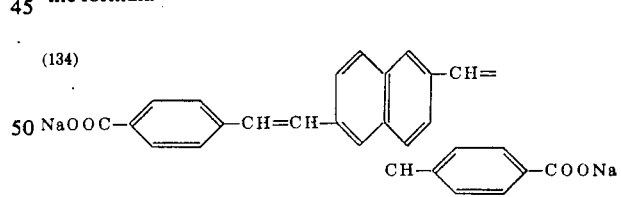

13.2 g. of the compound of the formula (134) in 150 ml. of anhydrous chlorobenzene and 20 ml. of thionylchloride and 1 ml. of dimethylformamide are heated, while being stirred, within 45 minutes to 100° C. and then kept for 2 hours at 100° to 103° C., then cooled to 15° C.; the crystalline product is suctioned off and recrystallized from 300 ml. of chlorobenzene with addition of 5 ml. of thionylchloride.

Yield: about 10.3 g. (=79.3 percent of theory) of the compound of the formula

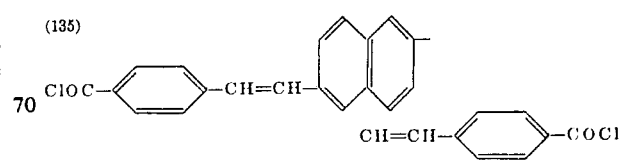

as a yellow powder melting (partially) at 265° C.

Analysis: $C_{29}H_{19}Cl_3O_3$
calculated: C 73.27 H 3.97 Cl 15.50
found: C 73.27 H 3.94 Cl 15.49.

4.0 g. of the compound of the formula (135) in 200 ml. of anhydrous chlorobenzene are stirred for 3 hours at 50° to 60° C. while injecting dry dimethylamine. The batch is then cooled, the product suctioned off and recrystallized from 100 ml. of dimethylformamide.

Yield: about 3.8 g. (=91.8 percent of theory) of the compound of the formula (136)

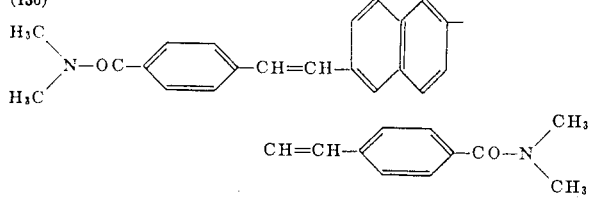

as pale-yellow flakes melting at 302° to 304° C.

Analysis: $C_{30}H_{28}N_2O_2$
calculated: C 80.98 H 6.37 N 5.90
found: C 81.04 H 6.31 N 5.87.

When methylamine is used instead of dimethylamine, there are obtained about 3.3 g. (=84.5 percent of theory) of the compound of the formula (137)

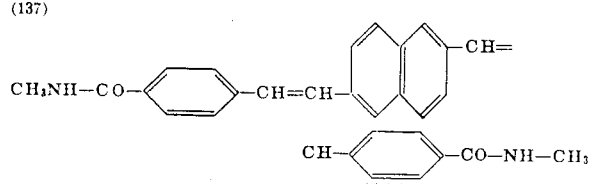

as a pale-yellow, crystalline powder melting above 300° C.

Analysis: $C_{28}H_{24}N_2O_2$
calculated: C 80.69 H 5.87 N 6.27
found: C 80.49 H 5.73 N 6.16.

EXAMPLE 17

A mixture of 42.8 g. of 2,6-bis-(diethoxyphosphonomethyl)-naphthalene, 10.6 g. of benzaldehyde and 21.1 g. of the sodium salt of benzaldehyde-2sulphonic acid (having a content corresponding to about 88 percent of free sulphonic acid) in 100 ml. of dimethylformamide is added to a well-stirred suspension of 50.5 g. of powdered potassium hydroxide (of about 89 percent strength) in 300 ml. of dimethylformamide, with the air being displaced from the reaction vessel by a continuous current of nitrogen. By cooling with ice water it is ensured that during this the temperature of the reaction mixture does not rise above 45° C. The whole is then stirred on for 3 hours at 40° to 45° C., the reaction mixture is poured into 2.5 liters of distilled water heated to about 70° C., 1.5 kg. of ice are added; the pH value of the suspension is adjusted to about 7 by adding about 31 ml. of concentrated hydrochloric acid, and the product is suctioned off and thoroughly expressed. The almost dry product is dissolved in 300 ml. of boiling dimethylformamide, cooled, the product which has crystallized out is suctioned off, the filtrate heated to the boil, mixed with 400 ml. of distilled water, clarified by hot filtration; the clear filtrate is once more boiled, mixed with 600 ml. of boiling water, cooled, and the crystalline product is suctioned off and washed with 200 ml. of distilled water. The product obtained in this manner is dissolved in 100 ml. of dimethylformamide, clarified by filtration, the filtrate mixed at the boil with 150 ml. of distilled water, cooled, and the crystalline product is suctioned off and dried at 100° to 110° C. under vacuum, to yield 4.6 g. of the alkali metal salt of the compound which, in form of the free sulphonic acid, corresponds to the formula (138)

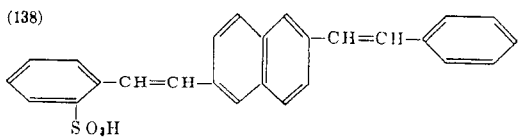

It is probably the sodium salt.

Analysis: $C_{25}H_{19}NaO_3S \cdot \tfrac{1}{2}H_2O$
calculated: C 70.41 H 4.54 S 7.23
found: C 70.32 H 4.48 S 6.81.

In a similar manner the compound of the formula (139)

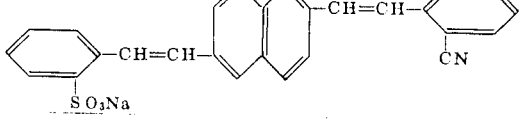

EXAMPLE 18

A mixture of 50.6 g. of 1-diethoxyphosphonomethyl-2-cyanobenzene and 28.6 g. of the sodium salt of naphthalene-2,6-dialdehyde-monosulphonic acid of the formula (142)

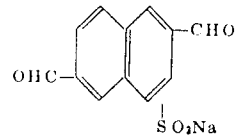

in 50 ml. of anhydrous dimethylformamide is added to a well-stirred suspension of 49.2 g. of powdered potassium hydroxide (of about 91 percent in strength) in 150 ml. of anhydrous dimethylformamide with exclusion of air. The reaction is strongly exothermic and, in spite of cooling with ice water, the temperature rises up to 56° C. The batch is stirred on for 3 hours at 40° to 45° C., then cooled to 15° C. and, while being cooled, 200 ml. of distilled water are dropped in. The product is suctioned off, washed with distilled water, dissolved at the boil in a mixture of 250 ml. of dimethylformamide and 100 ml. of water, clarified by filtration and cooled. The product, which crystallizes out in small needles, is suctioned off and twice recrystallized from a mixture of 1,000 ml. of ethanol and 500 ml. of water on each occasion, then dried at 80° to 85° under vacuum.

This procedure gives the alkali metal salt of a monosulphonic acid which, in form of the free acid, corresponds to the formula (140)

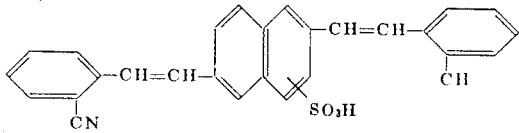

It is probably the potassium salt.

Analysis: $C_{26}H_{17}KN_2O_3S$
calculated: C 67.18 H 3.42 N 5.59 S 6.40
found: C 67.04 H 3.61 N 5.37 S 6.85.

In an analogous manner, using 1-diethoxyphosphonomethyl-2-chlorobenzene, the compound of the formula (141)

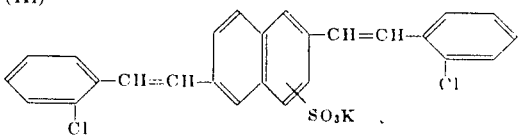

is obtained.

Analysis: $C_{26}H_{17}Cl_2KO_3S \cdot 1 H_2O$
calculated: 58.10  H 3.56  S 5.97
found: 58.40  H 3.52  S 6.41.

The sodium salt of the naphthalene-2,6-dialdehyde-monosulphonic acid of the formula (142) can be prepared thus:

92 g. of naphthalene-2,6-dialdehyde are introduced with stirring within 45 minutes into 300 ml. of oleum (containing 66 percent of $SO_3$) at such a rate that the temperature of the reaction can be maintained below 50° C. by cooling with ice water. The batch is then stirred for 1 hour at 45° to 50° C. and then slowly stirred over 2 kg. of ice and 500 ml. of water. The resulting solution is neutralized with 2,200 g. of barium carbonate during which the reaction mixture, to prevent its solidification, is heated towards the end of the neutralization to about 65° C. The suspension is suctioned while hot, rinsed with about 1 liter of boiling distilled water and the filtrate is cooled. The crystalline barium salt formed is suctioned off and dried at 100° to 110° C. under vacuum.

Yield: about 84 g. (=75 percent of theory). The product is then recrystallized from 2×500 ml. of water.

Yield: 72.2 g. (=60.2 percent of theory).

Seventy grams of the resulting barium salt are dissolved in 1 liter of distilled water, 15 g. of 95 percent sulphuric acid are added, the precipitated barium salt is filtered off, the clear filtrate accurately neutralized with sodium hydroxide solution, evaporated until crystallization sets in, cooled, and the crystalline product is suctioned off and dried at 80° to 85° C. under vacuum.

Yield: 59.5 g. (=42 percent of theory) of the compound of the formula (142).

Analysis: $C_{12}H_7NaO_4S$
calculated: C 50.35  H 2.47  S 11.20
found: C 50.31  H 2.64  S 11.42.

EXAMPLE 19

A mixture of 22.8 g. of diethoxyphosphonomethylbenzene and 14.3 g. of the sodium salt of naphthalene-2,6-dialdehyde-monosulphonic acid of the formula (142) in 100 ml. of anhydrous dimethylformamide is added with exclusion of air to a well-stirred suspension of 24.8 g. of powdered potassium hydroxide (of about 91 percent strength) in 100 ml. of methylformamide, during which the temperature of the reaction mixture rises to about 45° C. The whole is stirred on for 1¼ hours at 40° to 45° C., then poured into 1.3 liters of distilled water heated at about 70° C.; 200 g. of sodium chloride and then 700 g. of ice are added and the whole is stirred for 1 hour at room temperature; the crystallizate is suctioned off, washed with a solution of 200 g. of sodium chloride in 1 liter of water and twice recrystallized from ethanol.

Yield: 8.8 g. (=40.5 percent of theory) of the compound of the formula (143)
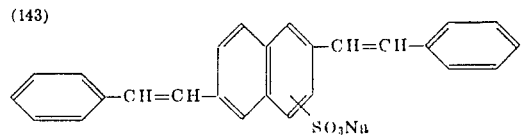

in form of light-yellow, small needles.
Analysis: $C_{26}H_{19}NaO_3S$.

EXAMPLE 20

A mixture of 20 g. of the compound of the formula (140) in form of the alkali metal salt thionylchloride. 200 ml. of anhydrous chlorobenzene, 20 ml. of thionylchloride and 1 ml. of dimethylformamide is slowly stirred and heated to 100° C. and then for 2½ hours at 100° to 110° C. After cooling, the crystallizate is suctioned off and recrystallized from 300 ml. of o-dichlorobenzene with addition of 10 ml. of thionylchloride.

Yield: 17.3 g. (=87 percent of theory) of the compound of the formula (144)
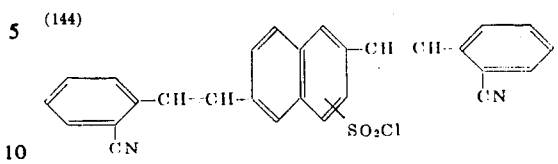

as a yellow, crystalline powder melting at 205° C. with decomposition.

Five grams of the resulting compound of the formula (144) in 200 ml. of chlorobenzene are stirred for 5 hours at 55° to 60° C. while injecting dimethylamine. After cooling, the product which has crystallized out is suctioned off, washed with methanol and water and dried at 80° to 85° C. under vacuum.

Yield: 4.6 g. (=97.8 percent of theory) of the compound of the formula (145)
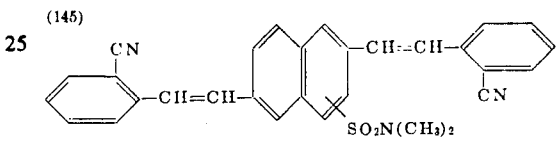

as a yellow, crystalline powder melting at 239°–240° C.

Recrystallization from 100 ml. of dimethylformamide gives 3.1 g. (=65.9 percent of theory) of the compound of the formula (145) melting at 240°–241° C.

Analysis.—$C_{30}H_{23}N_3O_2S$: Calculated: C, 73.60; H, 4.74; N, 8.58; S, 6.55. Found: C, 73.46; H, 4.84; N, 8.68; S, 6.72.

An analogous reaction with methylamine furnishes the compound of the formula (146)
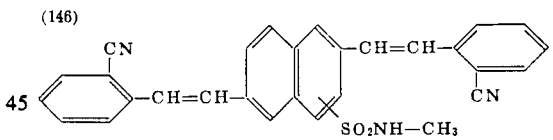

as a yellow, crystalline powder melting at 285°–286° C.

When 10 ml. of 3-methoxypropylamine and 200 ml. of absolute ethanol are used, and allowed to react for 2 hours at 75° to 80° C., the compound of the formula (147)
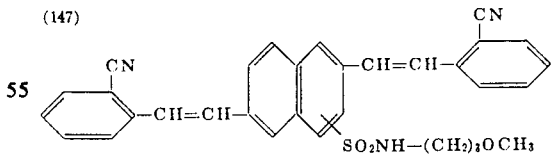

is obtained as a light-yellow, crystalline powder melting at 228° to 229° C.

EXAMPLE 21

A homogeneous mixture of 10.7 g. of 1,5-bis-(diethoxyphosphonomethyl)-naphthalene of the formula (149)
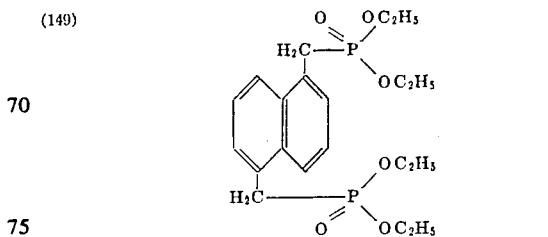

and 12.5 g. of the sodium salt of benzaldehyde-2-sulphonic acid (having a content corresponding to about 88 percent of free sulphonic acid) are added with exclusion of air to a well-stirred suspension of 12.6 g. of powdered potassium hydroxide in 200 ml. of dimethylformamide at 40° to 45° C., then stirred on for 3 hours at 40° to 45° C.; the reaction mixture is poured into about 1.3 liters of distilled water heated at about 70° C., mixed with 600 g. of sodium chloride and then about 700 g. of ice are added. The crystallizate is suctioned off and twice recrystallized from water. Yield: 8.7 g. (=65.0 percent of theory) of the compound of the formula (148)
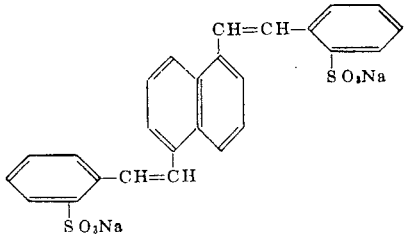

as a yellow powder.

The 1,5-bis-(diethoxyphosphonomethyl)-naphthalene used as starting material can be prepared thus:

Twenty-eight grams of 1,5-bis-(bromomethyl)-naphthalene [prepared by reacting 1,5-dimethylnaphthalene with N-bromosuccinimide in carbon tetrachloride] are stirred at 130° to 135° C. within about 30 minutes into 150 ml. of triethylphosphite. The resulting yellow, clear solution is stirred for 2 hours at 130° to 135° C., while making sure that the ethylbromide formed can distill off. The reaction mixture is then cooled to 5°–10° C., and the product which has crystallized out is suctioned off, washed with hexane and dried at 80° to 85° C. under vacuum.

Yield: about 28.4 g. (=74.3 percent of theory) of the compound of the formula (149) melting at 105° to 106° C.

EXAMPLE 22

31.4 g. of 2,6-bis-bromomethylnaphthalene and 58 g. of triphenylphosphine in 200 ml. of dimethylformamide are refluxed for 3 hours, then cooled, suction, the product is washed with dimethylformamide and methanol and dried, to furnish 73.1 g. (=87 percent of theory) of the phosphonium salt of the formula (150)
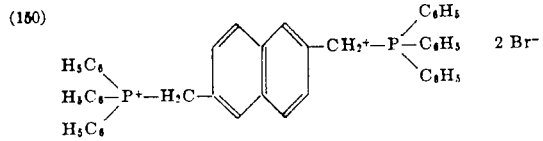

as a white powder which does not melt up to 360° C.

8.38 g. of this phosphonium salt and 2.81 g. of 4-cyanobenzaldehyde in 100 ml. of absolute alcohol are mixed, with exclusion of air and moisture, with 2.4 g. of potassium tertiary butylate and stirred for 5 hours at 40° C. and then for 15 minutes at the reflux temperature. After cooling, suctioning, washing with alcohol and drying, there are obtained 3.7 g. of a mixture of the stereoisomers of the compound of the formula (126) as a pale-yellow powder which melts at 235° to 255° C. after one recrystallization from chlorobenzene.

EXAMPLE 23

When in example 2 the 2,6-bis-(diethoxyphosphonomethyl)-naphthalene is replaced by the equivalent quantity of 2,6-bis-(ethoxyphenylphosphonomethyl)-naphthalene, the compound of the formula (101) is obtained in a similar yield and purity.

2,6-Bis-(ethoxyphenylphosphonomethyl)-naphthalene is obtained in the following manner:

15.7 g. of 2,6-bis-bromomethylnaphthalene and about one third of the whole quantity of 23.75 g. of diethoxyphenylphosphine to be added are heated to 78° C., whereupon elimination of ethylbromide sets in. The remaining two thirds of diethoxyphenylphosphine are then dropped in, then the whole is diluted with 10 ml. of toluene and stirred for 2 hours at the reflux temperature (92° C.). Recrystallization of the reaction mixture from benzene gives 17.2 g. (=67.2 percent of theory) of the phosphinic acid ester of the formula (151)
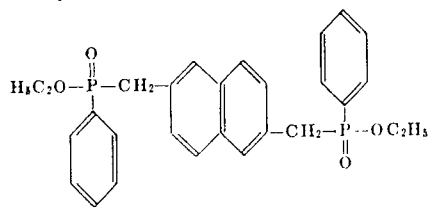

as colorless crystals melting at 173° to 175° C.

EXAMPLE 24

A mixture of 5.6 g. of the bisphosphine oxide of the formula (152), 4.6 g. of potassium tertiary butylate and 200 ml. of anhydrous toluene is stirred at the reflux temperature under nitrogen. A solution of 2.9 g. of p-cyanobenzaldehyde in 50 ml. of toluene is dropped in, and the mixture, which thereupon turns dark, is refluxed for another 2 hours, and 75 ml. of toluene are distilled off. After having cooled the mixture to room temperature, it is mixed with 50 ml. of water, and the batch is filtered and the yellowish residue repeatedly washed with methanol and water. The dried product is freed from unreacted bisphosphine oxide by being extracted with dioxane and the extract is recrystallized from dioxane and o-dichlorobenzene, to furnish the dinitrile of the formula (126) in form of light-yellow, small needles melting at 273° C. (turbid).

The bisphosphine oxide of the formula (152)
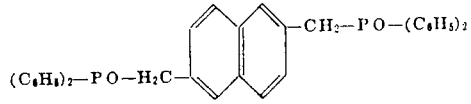

used as starting material is accessible thus:

A mixture of 31.4 g. of 2,6-di-(bromomethyl)-naphthalene and 48.5 g. of P-chloro-diphenylphosphine is slowly heated to 100° to 110° C. while being vigorously stirred under nitrogen. An exothermic reaction sets in and raises the temperature for a short time to 175° C. and the mixture solidifies completely; it is cooled to 40° to 50° C. and 100 ml. of methanol are dropped in so rapidly that the evolution of gas can be controlled (about 40 minutes). The resulting white crystalline magma is refluxed for a few hours longer until no more gas is being evolved, then cooled to room temperature, suctioned and the residue is washed with 2×30 ml. of methanol and dried, to yield 41.2 g. (=74 percent of theory) of a white powder melting at 343° to 345° C. Recrystallization from 500 ml. of dimethylsulphoxide gives 33.7 g. of small, colorless needles melting at 345° C.

Analysis: $C_{30}H_{24}O_2P_2$
calculated: P 11.13
found: P 11.06.

EXAMPLE 25

A bleached cotton fabric is washed at a goods-to-liquor ratio of 1:20 for 15 minutes at 55° C. in a liquor containing per liter the following ingredients:

0.032 g. of the brightener of the formula (101)
1 g. of active chlorine (Javelle water)
4 g. of a washing powder consisting of:
   15.00% of dodecylbenzenesulphonate
   10.00% of sodium laurylsulphonate
   40.00% of sodium tripolyphosphate
   25.75% of sodium sulphate, anhydrous
   7.00% of sodium metasilicate
   2.00% of carboxymethylcellulose and
   0.25% of ethylenediaminetetraacetic acid.

After having been rinsed and dried the fabric reveals a good brightening effect which is fast to acids and chlorine.

A good brightening effect is also achieved when washing is performed for 15 minutes at 25° C.

When 0.008 g. of the brightener of the formula (101) or (108) is used instead of 0.032 g. of the brightener of the formula (101), a good brightening effect is likewise obtained.

When 0.002 g. of the brightener of the formula (101) or (108) is used and the washing operation is repeated 5 to 10 times with the identical cotton fabric, a good brightening effect is obtained after only five washes.

If desired, the washing powder of the above composition may be directly incorporated with the brightener of the formula (101) or (108).

EXAMPLE 26

A bleached cotton fabric is washed at a goods-to-liquor ratio of 1:20 for 15 minutes at 50° C. in a liquor containing per liter the following ingredients:

```
0.004 to 0.008 g. of the brightener of the
  formula 101, 109, 138, 140, 141 or 143
  0.25    g. of active     chlorine (Javelle water)
  4       g. of a washing  powder consisting of:
          15.00% of   dodecylbenzenesulphonate
          10.00% of   sodium laurylsulphonate
          40.00% of   sodium tripolyphosphate
          25.75% of sodium sulphate, anhydrous
           7.00% of   sodium metasilicate
           2.00% of   carboxymethylcellulose and
           0.25% of   ethylenediaminetetraacetic
```

The liquor is prepared, heated to 50° C. and 15 minutes later the cotton fabric is immersed in it. After having been rinsed and dried, the fabric reveals a good brightening effect which has good fastness to acids and chlorine.

A good brightening effect is also achieved when the washing operation is performed in the identical manner for 15 minutes 25° C.

If desired, the brightener of the formula 101, 109, 138, 140, 141 or 143 may be incorporated directly with the washing powder of the above-mentioned composition.

EXAMPLE 27

A polyamide fiber fabric (Perlon-Helanca) is washed at a goods-to-liquor ratio of 1:20 for 15 minutes in a liquor heated to 50° C. which contains per liter the following ingredients:

```
0.004 to 0.008 g. of the brightener of the
109, 119, 138, 140, 141 or 143
  0.25    g. of active     chlorine (Javelle water)
  4       of a washing     powder consisting of:
          15.00% of   dodecylbenzenesulphonate
          10.00% of   sodium laurylsulphonate
          40.00% of   sodium tripolyphosphate
          25.75% of   sodium sulphate, anhydrous
  7.00% of            sodium metasilicate
          2.00% of    carboxymethylcellulose and
          0.25% of ethylenediaminetetraacetic
```

The polyamide fiber fabric is immersed in the bath 15 minutes after the latter has been prepared and heated to 50° C. After having been rinsed and dried, the fabric displays a good brightening effect.

A similar, good brightening effect is achieved when the washing operation is performed in identical manner but at 25° C.

If desired, the brightener of the formula 109, 119, 138, 140, 141, or 143 can be directly incorporated with the washing powder of the above composition.

EXAMPLE 28

A polyamide fiber fabric (Perlon) is immersed at 60° C. at a goods-to-liquor ratio of 1:30 in a bath which contains, referred to the weight of the fabric, 0.1 percent of the brightener of the formula (101) and, per liter, 0.5 ml. of 80 percent acetic acid, 1.2 g. of sodium pyrophosphate and 1.8 g. of sodium hydroxulphite. The whole is heated within 30 minutes to the boil and thus maintained for 30 minutes. After rinsing and drying, a strong brightening effect is achieved.

EXAMPLE 29

At polyamide fiber fabric (Perlon) is immersed at 60° C. at a goods-to-liquor ratio of 1:40 in a bath containing (referred to the weight of the fabric) 0.1 percent of one of the brighteners of formula 101, 103, 106, 108, 109, 114, 116, 117, 119, 120, 121, 138, 141, 143, 145 or 148 and, per liter, 1 g. of 80 percent acetic acid and 0.25 g. of an adduct of 30 to 35 mols of ethylene oxide with 1 mol of commercial stearyl alcohol. The whole is then heated within 30 minutes to the boil and thus maintained for 30 minutes. After rinsing and drying, a good brightening effect is achieved.

When using a polyamide 66 (nylon) fabric instead of a polyamide 6 fabric, a similar brightening effect is obtained.

Finally, it is also possible to work under high-temperature conditions, for example for 30 minutes at 130° C.; for this variant it is advisable to add 3 g. of hydrosulphite per 1 liter of liquor.

EXAMPLE 30

A bleached cotton fabric is washed at a goods-to-liquor ratio of 1:20 for 30 minutes at 60° to 95° C. in a liquor containing per liter the following ingredients:

```
      0.04    g. of the brightener of
  formula 101, 103, 104, 109, 138, 140, 141 or 143
      4       g. of a washing powder of
              the following composition:
              40.0% of soap flakes
              15.0% of    sodium tripolyphosphate
               8.0% of sodium perborate
               1.0% of magnesium silicate
              11.0% of sodium metasilicate
              (9 H₂O)
              24.6% of calcined soda and
               0.4% of   ethylenediaminetetraacetic
                         acid.
```

After having been rinsed and dried, the fabric displays a good brightening effect.

EXAMPLE 31

Bleached cotton poplin is impregnated with a ureaformaldehyde precondensate and ammonium nitrate; the impregnating solution further contains per liter 1.5 g. of the compound of the formula (101). The fabric is expressed to a weight increase of about 80 percent and the resin is then condensed for 5 minutes at 150° C. A brilliant white and good anticrease resistance are achieved.

EXAMPLE 32

Bleached wool fabric is treated at a goods-to-liquor ratio of 1:40 for 60 minutes in a bath which contains 0.1 percent to 0.4 percent of the brightener of the formulas 101, 103, 104, 109, 138 or 143, referred to the weight of the fibers, and 0.4 g. of hydrosulphite per liter. After rinsing and drying, a good brightening effect is observed.

Good brightening effects are also achieved when, instead of hydrosulphite, 5 percent of acetic acid, referred to the fiber weight, is added to the bath.

EXAMPLE 33

Polyacrylonitrile fibers (Orlon 42) are immersed at a goods-to-liquor of 1:40 in an aqueous bath containing per liter 1 g. of 85 percent formic acid and 0.2 percent of the compound of the formula (118), referred to the fiber weight. The treatment bath is heated to the boil within 30 minutes and kept boiling for 30 to 60 minutes longer. After having been rinsed and dried, polyacrylonitrile fibers are obtained which display a good brightening effect.

Good brightening effects are also obtained when Courtelle fibers are treated according to this example.

EXAMPLE 34

A polyester fabric (for example Dacron) is padded at room temperature (about 20° C.) with an aqueous dispersion containing per liter 0.1 to 1 g. of one of the compounds of formula 114, 116, 117, 119, 121, 122, 123, 125, 131 or 132 and 1 g. of an adduct of about 35 mols of ethylene oxide with 1 mol of octadecyl alcohol, and then dried at about 100° C. The dry material is subjected to a heat treatment for 30 seconds at about 220° C. The polyester fabric thus treated displays a good optical brightening effect.

EXAMPLE 35

A fabric of polyvinylchloride fibers ("Thermouyl") is padded at room temperature (about 20° C.) with an aqueous dispersion containing per liter 1 to 2 g. of the compound of the formula (117) and 1 g. of an adduct of about 35 mols of ethylene oxide with 1 mol of octadecyl alcohol, and then dried at about 70° C. The dry material is subjected to a heat treatment for 3 minutes at 100° C. The fabric of polyvinylchloride fibers treated in this manner has a substantially higher white content than untreated, identical material.

EXAMPLE 36

A cellulose acetate fabric is immersed at a goods-to-liquor ratio of 1:30 to 1:40 at 50° C. in an aqueous bath containing 0.15 percent of the compound of the formula 109, 119, or 141, referred to the fiber weight. The bath is heated to 90° to 95° C. and thus kept for 30 to 45 minutes. After rinsing and drying, a good brightening effect is obtained.

EXAMPLE 37

Ten kilograms of a polyamide, prepared in known manner from hexamethylenediamine adipate, in chip form are mixed with 30 g. of titanium dioxide (rutile modification and 5 g. of the compound of formula 101, 103, 104, 122, 127, 131, 132, 136 or 145 in a tumbler for 12 hours. The chips thus treated are then melted in a boiler heated with oil or diphenyl vapor at 300° to 310° C., from which the atmospheric oxygen has been displaced by steam, and the melt is stirred for half an hour and then expressed under a nitrogen pressure of 5 atmospheres (gauge) through a spinneret; the resulting filament is cooled and then wound on a spinning bobbin. The resulting filaments display a good brightening effect.

When, instead of a polyamide manufactured from hexamethylenediamine adipate, an ε-caprolactam polyamide is used, similar, good results are obtained.

EXAMPLE 38

One hundred grams of terephthalic acid ethyleneglycol polyester granulate are intimately mixed with 0.05 g. of the compound of the formula (126) or (131) and melted at 285° C. while being stirred. After spinning through conventional spinnerets strongly brightened polyester fibers are obtained.

The compound of the formula 126 or 131 may alternatively be added to the starting material prior to or during the polycondensation leading to the polyester.

We claim:

1. A styrene-naphthalene derivative of the formula

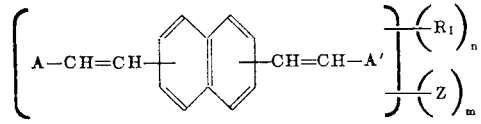

in which A and A', independently of each other, each represent phenyl, naphthyl or diphenylyl and the substituents —CH:CH—A and —CH:CH—A' are linked in positions 1,5 or 2,6 of the naphthalene ring system; $R_1$ represents a substituent, attached to A, A' or to the central naphthalene ring system selected from the group consisting of a sulphonic acid group or a salt thereof, a sulphochloride group, a sulphonic acid alkyl ester group with one to 18 carbon atoms in the alkyl residue, a sulphonic acid phenyl ester, a sulphonamide group which may be substituted by one or two alkyl, hydroxyalkyl or alkoxyalkyl residues containing one to 12 carbon atoms, a sulphonmorpholide group, a carboxylic acid group or a salt thereof, a carboxylic acid chloride group, a carboxylic acid alkyl ester group with one to 18 carbon atoms in the alkyl residue, a carboxylic acid amide group which may be substituted by one or two alkyl residues containing one to 12 carbon atoms a sulphone group or nitrile group; $n=1, 2, 3$ or $4$; Z represents hydrogen, halogen, alkyl or alkoxy with up to 12 carbon atoms each, phenoxy or phenylalkyl with one to four carbon atoms in the alkyl residue, and $m=1$ or 2.

2. A styryl-naphthalene derivative according to claim 1 of the formula

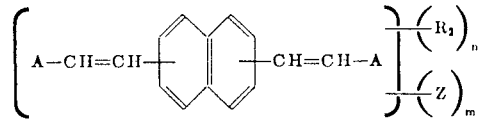

in which A represents phenyl and the substituents —CH:CH—A are linked in positions 1,5 or 2,6 of the naphthalene ring system; $R_2$ represents a substituent linked with the benzene residues A or with the central naphthalene ring system selected from the group consisting of a sulphonic acid group or a salt thereof, a sulphochloride group, a sulphonic acid alkyl ester group with one to 18 carbon atoms in the alkyl residue, a sulphonic acid phenyl ester, a sulphonamide group which may be substituted by one or two alkyl, hydroxyalkyl or alkoxyalkyl residues containing one to 12 carbon atoms, a sulphon-morpholide group, a carboxylic acid group or a salt thereof, a carboxylic acid chloride group, a carboxylic acid alkyl ester group with one to 18 carbon atoms in the alkyl residue, a carboxylic acid amide group which may be substituted by one or two alkyl residues containing one to 12 carbon atoms or a nitrile group; $n=1, 2, 3$ or $4$; Z represents hydrogen, halogen, alkyl or alkoxy with up to 12 carbon atoms each, phenoxy or phenylalkyl with one to four carbon atoms in the alkyl residue, and $m=1$ or 2.

3. A styryl-naphthalene derivative according to claim 1 of the formula

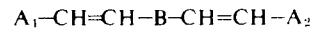

in which B represents a naphthyl and in which $A_1$—CH:CH— and $A_2$—CH:CH— are linked in positions 1,5 or 2,6 of the naphthalene ring system; $A_1$ and $A_2$ represent phenyl may carry identical or different substituents, at least one of the cyclic systems $A_1$, $A_2$ or B containing one to two substituents selected from the group consisting of a sulphonic acid group or a salt thereof, a sulphochloride group, a sulphonic acid alkyl ester group with one to 18 carbon atoms in the alkyl residue, a sulphonic acid phenyl ester, a sulphonamide group which may be substituted by one or two alkyl, hydroxyalkyl or alkoxyalkyl residues containing one to 12 carbon atoms, a sulphonmorpholide group, a carboxylic acid group or a salt thereof, a carboxylic acid chloride group, a carboxylic acid alkyl ester group with one to 18 carbon atoms in the alkyl residue, a carboxylic acid amide group which may be substituted by one or two alkyl residues containing one to 12 carbon atoms or a nitrile group, and may additionally contain one or several alkyl or alkoxy groups which contain up to 18 carbon atoms each, halogen atoms or methylenedioxy groups.

4. A styryl-naphthalene derivative according to claim 1 of the formula

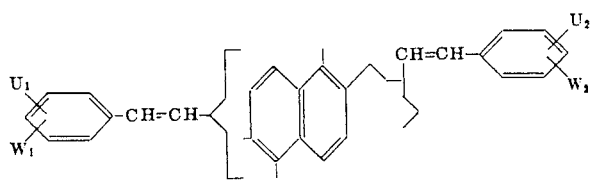

in which $U_1$ and $U_2$ each represents hydrogen, a sulphonic acid group or a salt thereof, a sulphochloride group, a sulphonic acid alkyl ester group with one to 18 carbon atoms in the alkyl residue, a sulphonic acid phenyl ester, a sulphonamide group which may be substituted by one or two alkyl, hydroxyalkyl or alkoxyalkyl residues containing one to 12 carbon atoms, a sulphonmorpholide group, a carboxylic acid group or a slat thereof, a carboxylic acid chloride group, a carboxylic acid alkyl ester group with one to 18 carbon atoms in the alkyl residue, a carboxylic acid amide group which may be substituted by one or two alkyl residues containing one to 12 carbon atoms a nitrile group, an alkylsulphone group containing one to four carbon atoms or a phenylsulphone group, at least one of the symbols $U_1$ or $U_2$ has a meaning different from hydrogen and as indicated; $W_1$ and $W_2$ each represents hydrogen, halogen, an alkyl or alkoxy group each containing one to eight carbon atoms a sulphonic acid group or a salt thereof, a sulphochloride group, a sulphonic acid alkyl ester group with one to 18 carbon atoms in the alkyl residue, a sulphonic acid phenyl ester, a sulphonamide group which may be substituted by one or two alkyl, hydroxyalkyl or alkoxyalkyl residues containing one to 12 carbon atoms a sulphonomorpholide group, a carboxylic acid group or a salt thereof, a carboxylic acid chloride group, a carboxylic acid alkyl ester group with one to 18 carbon atoms in the alkyl residue, a carboxylic acid amide group which may be substituted by one or two alkyl residues containing one to 12 carbon atoms or a nitrile group.

5. A styryl-naphthalene derivative according to claim 1, of the formula

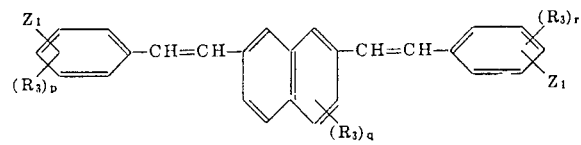

in which $R_3$ represents a sulphonic acid group or a salt thereof, a sulphonamide group which may be substituted, by one or two alkyl, hydroxyalkyl or alkoxyalkyl groups containing one to 12 carbon atoms a sulphonic acid ester group containing one to 18 carbon atoms in the alkyl residue alkylsulphone group containing one to four carbon atoms a carboxylic acid group or salt thereof, a carboxyamide group which may be substituted, a carboxylic acid ester group containing one to 18 carbon atoms in the alkyl residue or a nitrile group; $p$, $q$ and $r$ each is 0, 1 or 2 and the sum $(p+q+r)$ is 1, 2, 3 or 4; and $Z_1$ represents hydrogen, halogen or an alkyl or alkoxy group containing up to 12 carbon atoms.

6. A styryl-naphthalene derivative according to claim 1, of the formula

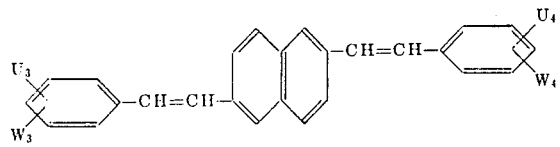

in which $U_3$ and $U_4$ each represents hydrogen, a carboxylic acid group, a carboxylic acid ester group containing one to 18 carbon atoms in the alkyl residue, a carboxylic acid amide group, an alkylsulphone group containing one to four carbon atoms, a sulphonic acid group, a sulphonic acid ester group containing one to 18 carbon atoms in the alkyl residue, a sulphonamide group or a nitrile group and at least one of the symbols $U_3$ or $U_4$ has a meaning different from hydrogen and as indicated; and $W_3$ and $W_4$ each represents hydrogen, halogen, or an alkyl or alkoxy group containing one to eight carbon atoms each.

7. A styryl-naphthalene derivative according to claim 1, of the formula

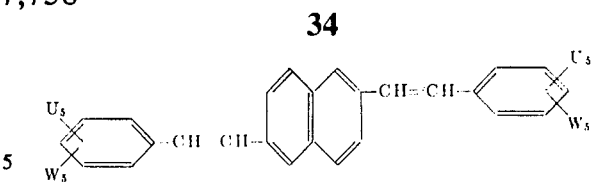

in which $U_5$ represents a sulphonic acid group or an alkali or alkaline earth metal salt thereof, an $-SO_2NH_2$ group, or a sulphonamide group substituted by one or two aliphatic residues containing one to 12 carbon atoms, or a morpholino group; a sulphonic acid phenylester group, an alkylsulphone group containing one to four carbon atoms, a carboxylic acid group or an alkali or alkaline earth metal salt thereof, a carboxylic acid alkyl ester group containing one to four carbon atoms in the alkyl residue; a carboxylic acid amide, alkylamide or dialkylamide group with one to four carbon atoms in the alkyl residue, or the nitrile group; and $W_5$ represents hydrogen, a sulphonic acid group or an alkali or alkaline earth metal salt thereof, or an alkyl or alkoxy group with one to four carbon atoms.

8. A styryl-naphthalene derivative according to claim 1, of the formula

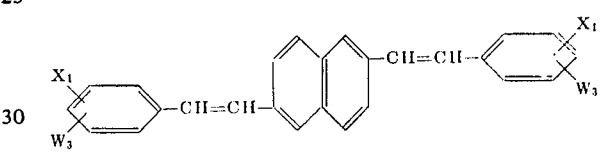

in which $X_1$ represents a sulphonic or carboxylic acid group and $W_3$ represents hydrogen, halogen, or an alkyl or alkoxy group each containing one to eight carbon atoms.

9. A styryl-naphthalene derivative according to claim 1, of the formula

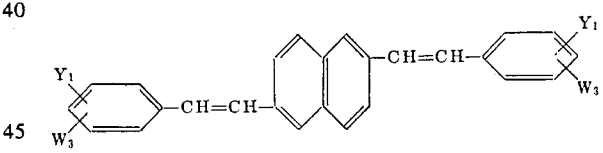

in which $Y_1$ represents the nitrile group, an alkylsulphone group, a sulphonic acid alkyl ester group containing one to 18 carbon atoms in the alkyl residue, a sulphonamide group, a carboxylic acid ester group containing one to 18 carbon atoms in the alkyl residue, or a carboxylic acid amide group, and $W_3$ stands for hydrogen, halogen or an alkyl or alkoxy group each containing one to 18 carbon atoms.

10. A styryl-naphthalene derivative according to claim 1 of the formula

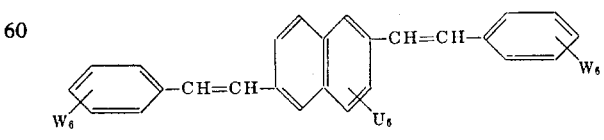

in which $W_6$ represents hydrogen, halogen or the nitrile group, and $U_6$ represents a sulphonic acid group or an alkali or alkaline earth metal salt thereof, an $-SO_2NH_2$ group or a sulphonamide group substituted by one or two aliphatic residues containing one to 12 carbon atoms or by a morpholino group.

* * * * *